United States Patent
Yu et al.

(10) Patent No.: US 10,924,729 B2
(45) Date of Patent: Feb. 16, 2021

(54) METHOD AND DEVICE FOR CALIBRATION

(71) Applicant: ArcSoft Corporation Limited, Hangzhou (CN)

(72) Inventors: Li Yu, Shanghai (CN); Menghan Liu, Shanghai (CN); Wang Miao, Shanghai (CN)

(73) Assignee: ArcSoft Corporation Limited, Hangzhou (CN)

(*) Notice: Subject to any disclaimer, the term of this patent is extended or adjusted under 35 U.S.C. 154(b) by 157 days.

(21) Appl. No.: 16/176,439

(22) Filed: Oct. 31, 2018

(65) Prior Publication Data
US 2019/0132584 A1    May 2, 2019

(30) Foreign Application Priority Data
Nov. 1, 2017   (CN) .......................... 201711063569.2

(51) Int. Cl.
| | | |
|---|---|---|
| G06K 9/00 | (2006.01) | |
| H04N 17/00 | (2006.01) | |
| H04N 5/33 | (2006.01) | |
| H04N 5/341 | (2011.01) | |

(52) U.S. Cl.
CPC .......... *H04N 17/002* (2013.01); *H04N 5/33* (2013.01); *H04N 5/3415* (2013.01)

(58) Field of Classification Search
None
See application file for complete search history.

(56) References Cited

U.S. PATENT DOCUMENTS

| | | | | |
|---|---|---|---|---|
| 7,433,029 | B1* | 10/2008 | Hsu ..................... | G01B 11/26 |
| | | | | 356/141.5 |
| 2013/0010079 | A1* | 1/2013 | Zhang .................. | H04N 13/246 |
| | | | | 348/47 |
| 2019/0351319 | A1* | 11/2019 | Kuji ..................... | H04N 5/74 |

OTHER PUBLICATIONS

Office Action issued in corresponding CN Application No. 201711063569 dated Jun. 17, 2020 (10 pages).
Chen, Xiaoming, A Study of Real-Time Three-Dimensional Reconstruction and Filtering Algorithms Based on Kinect Depth Information, China Master's Thesis Full Text Database, Information Science and Technology, vol. vol. 7 of 2013 (28 pages).

* cited by examiner

*Primary Examiner* — Wei Wen Yang
(74) *Attorney, Agent, or Firm* — Osha Bergman Watanabe & Burton LLP

(57) ABSTRACT

The present invention provides a method and a device for calibration applied to the field of image processing. The method includes: acquiring a common two-dimensional image and an infrared image of a calibration object, wherein the calibration object carries a first pattern; calculating coordinates of the first pattern in the common two-dimensional image, acquiring coordinates of the first pattern in a global coordinate system, and calculating intrinsic parameters of a first camera device capturing the common two-dimensional image; and calculating coordinates of the first pattern in the infrared image, acquiring the coordinates of the first pattern in the global coordinate system, and calculating intrinsic parameters of a second camera device capturing the infrared image. The method for calibration is capable of enhancing calibration efficiency by a simple calibration method when calibrating a depth camera device.

21 Claims, 9 Drawing Sheets

METHOD AND DEVICE FOR CALIBRATION

CROSS-REFERENCE TO RELATED APPLICATIONS

This application claims priority to Chinese Patent Application No. 201711063569.2, filed on Nov. 1, 2017, which is hereby incorporated by reference in its entirety.

BACKGROUND OF THE INVENTION

Field of the Invention

The present invention relates to a method and device for image processing, and more particularly to a method and a device for calibration.

Description of the Prior Art

With current rapid development of industries such as robots and artificial intelligence, two-dimensional image information is no longer satisfactory and depth visual requirements are ever-increasingly emphasized. A depth camera can real-time acquire three-dimensional values and depth information of an object in an ambient environment to more truly restore the world observed by the human eye and thus bring a user with more natural and realistically experience. A current depth camera is frequently applied in fields such as simultaneous localization and mapping (SLAM), immersive interaction, driverless, three-dimensional reconstruction, gesture recognition and three-dimensional human face recognition.

However, a calibration method for a depth camera device in the prior art is complex and has lower calibration efficiency.

SUMMARY OF THE INVENTION

A method and a device for calibration provided by the present invention can resolve the issues that a calibration method for a depth camera device in the art is complex and has low efficiency.

According to a first aspect of the present invention, a method for calibration is provided. The calibration obtains intrinsic parameters and distortion coefficients of a first camera, intrinsic parameters and distortion coefficients of a second camera, and extrinsic parameters between the two cameras, such as relative rotation matrix and relative translation matrix. The method includes: acquiring a common two-dimensional image and an infrared image of a calibration object, wherein the calibration object carries a first pattern; calculating coordinates of the first pattern in the common two-dimensional image according to the common two-dimensional image, and acquiring coordinates of the first pattern in a global coordinate system; calculating, according to the coordinates of the first pattern in the common two-dimensional image and the coordinates of the first pattern in the global coordinate system, intrinsic parameters of a first camera device capturing the common two-dimensional image; calculating coordinates of the first pattern in the infrared image according to the infrared image, and acquiring the coordinates of the first pattern in the global coordinate system; and calculating, according to the coordinates of the first pattern in the infrared image and the coordinates of the first pattern in the global coordinate system, intrinsic parameters of a second camera device capturing the infrared image.

According to the first aspect of the present invention, in a first executable method of the first aspect of the present invention, the calibration object includes at least three equal-sized calibration boards, wherein the first patterns carried by the at least three calibration boards are identical; the first pattern includes first circular points or first ellipsoidal points distributed on the calibration board, and a difference between grayscale values of the first circular points or the first ellipsoidal points and a background of the calibration board is greater than a first threshold.

According to the first executable method of the first aspect of the present invention, in a second executable method of the first aspect of the present invention, the first circular points or the first ellipsoidal points are evenly distributed in rows and columns on the calibration board.

According to the first executable method of the first aspect of the present invention and the second executable method of the first aspect of the present invention, in a third executable method of the first aspect of the present invention, the step of acquiring the coordinates of the first pattern in the global coordinate system includes: acquiring coordinates of centers of the first circular points or the first ellipsoidal points in the global coordinate system; the step of calculating the coordinates of the first pattern in the common two-dimensional image according to the common two-dimensional image includes: detecting coordinates of the centers of the first circular points or the first ellipsoidal points in the common two-dimensional image; and the step of calculating the coordinates of the first pattern in the infrared image according the infrared image comprises: detecting coordinates of the centers of the first circular points or the first ellipsoidal points in the infrared image.

According to the first aspect of the present invention, or any executable method of the first executable method to the third executable method of the first aspect of the present invention, in a fourth executable method of the first aspect of the present invention, the coordinates of the same first pattern in the common two-dimensional image correspond to the coordinates of the first pattern in the infrared image.

According to any executable method of the first executable method to the fourth executable method of the first aspect of the present invention, in a fifth executable method of the first aspect of the present invention, the calibration object including the at least three equal-sized calibration boards includes: four equal-sized calibration boards included in the calibration object, wherein the four calibration boards are arranged in two rows and two columns; with the first camera device facing the four calibration boards, positions of the four calibration boards are defined as upper-left, upper-right, lower-left and lower-right, wherein for each calibration board, a vertical center axis thereof is defined as a vertical rotation axis, from which a downward direction is a positive direction of the vertical rotation axis, and a horizontal center axis thereof is defined as a horizontal rotation axis, from which a right direction is a positive direction of the horizontal rotation axis. A plane where the upper-left calibration is located is parallel to an imaging plane of the first camera device, the upper-right calibration board is rotated clockwise around the vertical rotation axis thereof by a first angle, the lower-left calibration board is rotated counterclockwise around the vertical rotation axis thereof by the first angle, and the lower-right calibration board is rotated counterclockwise around the horizontal rotation axis thereof by the first angle.

According to the fifth executable method of the first aspect of the present invention, in a sixth executable method of the first aspect of the present invention, the first angle is 30 degrees.

According to the first aspect of the present invention, or any executable method of the first executable method to the sixth executable method of the first aspect of the present invention, in a seventh executable method of the first aspect of the present invention, the calibration object carries a pattern indicating a placement direction of the calibration object.

According to the seventh executable method of the first aspect of the present invention, in an eighth executable method of the first aspect of the present invention, the pattern indicating the placement direction of the calibration object includes one of: a first number of second circular points arranged in one row and a second number of second circular points arranged in another row; the first number of second circular points arranged in one column, and the second number of second circular points arranged in another column; and the second circular points are arranged so as to form a pattern indicating the placement direction of the calibration object.

According to the first aspect of the present invention, or any executable method of the first executable method to the eighth executable method of the first aspect of the present invention, in a ninth executable method of the first aspect of the present invention, the first camera device and the second camera device have different fields of view.

According to the first aspect of the present invention, or any executable method of the first executable method to the ninth executable method of the first aspect of the present invention, in a tenth executable method of the first aspect of the present invention, an image captured by, between the first camera device and the second camera device, the camera device having a greater field of view includes an image of the entire calibration object; the image of the calibration object occupies a middle part of the common two-dimensional image, and occupies more than a first ratio of the common two-dimensional image; the image of the calibration object occupies a middle part of the infrared image, and occupies more than the first ratio of the infrared image.

According to the tenth executable method of the first aspect of the present invention, in an eleventh executable method of the first aspect of the present invention, the first ratio is 80%.

According to the first aspect of the present invention, or any executable method of the first executable method to the eleventh executable method of the first aspect of the present invention, in a twelfth executable method of the first aspect of the present invention, the step of acquiring the common two-dimensional image and the infrared image of the calibration object includes: simultaneously capturing one common two-dimensional image and one infrared image of the calibration object.

According to the first aspect of the present invention, or any executable method of the first executable method to the twelfth executable method of the first aspect of the present invention, in a thirteenth executable method of the first aspect of the present invention, the step of calculating, according to the coordinates of the first pattern in the common two-dimensional image and the coordinates of the first pattern in the global coordinate system, the intrinsic parameters of the first camera device capturing the common two-dimensional image includes: calculating, according to the coordinates of the first pattern in the common two-dimensional image, the coordinates of the first pattern in the global coordinate system, and a mapping relationship between a coordinate system of the common two-dimensional image and the global coordinate system, the intrinsic parameters of the first camera device capturing the common two-dimensional image; and the step of calculating, according to the coordinates of the first pattern in the infrared image and the coordinates of the first pattern in the global coordinate system, the intrinsic parameters of the second camera device capturing the infrared image includes: calculating, according to the coordinates of the first pattern in the infrared image, the coordinates of the first pattern in the global coordinate system, and a mapping relationship between a coordinate system of the infrared image and the global coordinate system, the intrinsic parameters of the second camera device capturing the infrared image.

According to the first aspect of the present invention, or any executable method of the first executable method to the thirteenth executable method of the first aspect of the present invention, in a fourteenth executable method of the first aspect of the present invention, the method further includes: optimizing the intrinsic parameters of the first camera device according to a difference between real coordinates of the first pattern and coordinates of the first pattern obtained from calculating the intrinsic parameters of the first camera device; and optimizing the intrinsic parameters of the second camera device according to a difference between the real coordinates of the first pattern and coordinates of the first pattern obtained from calculating the intrinsic parameters of the second camera device. In addition, distortion coefficients can be optimized according to the difference between the real coordinates of the first pattern and the coordinates of the first pattern calculated by the intrinsic parameters of the camera device.

According to the first aspect of the present invention, or any executable method of the first executable method to the fourteenth executable method of the first aspect of the present invention, in a fifteenth executable method of the first aspect of the present invention, the method further includes: calculating a relative rotation matrix between the first camera device and the second camera device according to a rotation matrix from the global coordinate system to a coordinate system of the first camera device and a rotation matrix from the global coordinate system to a coordinate system of the second camera device; and calculating a relative translation matrix between the first camera device and the second camera device according to a translation matrix from the global coordinate system to the coordinate system of the first camera device, a translation matrix from the global coordinate system to the coordinate system of the second camera device, and the relative rotation matrix between the first camera device and the second camera device.

According to the first aspect of the present invention, or any executable method of the first executable method to the fifteenth executable method of the first aspect of the present invention, in a sixteenth executable method of the first aspect of the present invention, the common two-dimensional image includes a black-and-white image or a color image.

According to a second aspect of the present invention, a system for calibration is provided. The calibration obtains intrinsic parameters and distortion coefficients of a first camera, intrinsic parameters and distortion coefficients of a second camera, and extrinsic parameters between the two cameras, such as relative rotation matrix and relative translation matrix. The system includes a calibration object, a first camera device, a second camera device and a first processor. The first camera device is for capturing a common two-dimensional image of the calibration object, wherein the calibration object carries a first pattern, and the second camera device is for capturing an infrared image of the calibration object. The first processor is for calculating coordinates of the first pattern in the common two-dimensional image according to the common two-dimensional image, acquiring coordinates of the first pattern in a global coordinate system, and calculating, according to the coordinates of the first pattern in the common two-dimensional image and the coordinates of the first pattern in the global coordinate system, intrinsic parameters of the first camera device capturing the common two-dimensional image; and further for calculating coordinates of the first pattern in the infrared image according to the infrared image, acquiring the coordinates of the first pattern in the global coordinate system, and calculating, according to the coordinates of the first pattern in the infrared image and the coordinates of the first pattern in the global coordinate system, intrinsic parameters of the second camera device capturing the infrared image.

According to the second aspect of the present invention, in a first executable method of the second aspect of the present invention, the calibration object includes at least three equal-sized calibration boards, wherein the first patterns carried by the at least three calibration boards are identical. The first pattern includes first circular points or first ellipsoidal points distributed on the calibration board, and a difference between grayscale values of the first circular points or the first ellipsoidal points and a background of the calibration board is greater than a first threshold.

According to the first executable method of the second aspect of the present invention, in a second executable method of the second aspect of the present invention, the first circular points or the first ellipsoidal points are evenly distributed in rows and columns on the calibration board.

According to the first executable method of the second aspect of the present invention or the second executable method of the second aspect of the present invention, in a third executable method of the second aspect of the present invention, the first processor is specifically for acquiring coordinates of centers of the first circular points or the first ellipsoidal points in the global coordinate system; the first processor is specifically for detecting coordinates of the centers of the first circular points or the first ellipsoidal points in the common two-dimensional image; the first processor is specifically for detecting coordinates of the centers of the first circular points or the first ellipsoidal points in the infrared image.

According to the second aspect of the present invention or any one of the first executable method to the third executable method of the second aspect of the present invention, in a fourth executable method of the second aspect of the present invention, the coordinates of the same first pattern in the common two-dimensional image correspond to the coordinates of the first pattern in the infrared image.

According to any one of the first executable method to the fourth executable method of the second aspect of the present invention, in a fifth executable method of the second aspect of the present invention, the calibration object includes four equal-sized calibration boards, and the four calibration boards are arranged in two columns and two rows; with the first camera device facing the four calibration boards, positions of the four calibration boards are defined as upper-left, upper-right, lower-left and lower-right, wherein for each calibration board, a vertical center axis thereof is defined as a vertical rotation axis, from which a downward direction is a positive direction of the vertical rotation axis, and a horizontal center axis thereof is defined as a horizontal rotation axis, from which a right direction is a positive direction of the horizontal rotation axis. A plane where the upper-left calibration is located is parallel to an imaging plane of the first camera device, the upper-right calibration board is rotated clockwise around the vertical rotation axis thereof by a first angle, the lower-left calibration board is rotated counterclockwise around the vertical rotation axis thereof by the first angle, and the lower-right calibration board is rotated counterclockwise around the horizontal rotation axis thereof by the first angle.

According to the fifth executable method of the second aspect of the present invention, in a sixth executable method of the second aspect of the present invention, the first angle is 30 degrees.

According to the second aspect of the present invention or any one of the first executable method to the sixth executable method of the second aspect of the present invention, in a seventh executable method of the second aspect of the present invention, the calibration object carries a pattern indicating a placement direction of the calibration object.

According to the seventh executable method of the second aspect of the present invention, in an eighth executable method of the second aspect of the present invention, the pattern indicating the placement direction of the calibration object may include one of: a first number of second circular points arranged in one row and a second number of second circular points arranged in another row; the first number of second circular points arranged in one column, and the second number of second circular points arranged in another column; and the second circular points are arranged so as to form a pattern indicating the placement direction of the calibration object.

According to the second aspect of the present invention or any one of the first executable method to the eighth executable method of the second aspect of the present invention, in a ninth executable method of the second aspect of the present invention, the first camera device and the second camera device have different fields of view.

According to the second aspect of the present invention or any one of the first executable method to the ninth executable method of the second aspect of the present invention, in a tenth executable method of the second aspect of the present invention, an image captured by, between the first camera device and the second camera device, the camera device having a greater field of view includes an image of the entire calibration object; the image of the calibration object occupies a middle part of the common two-dimensional image, and occupies more than a first ratio of the common two-dimensional image; the image of the calibration object occupies a middle part of the infrared image, and occupies more than the first ratio of the infrared image.

According to the tenth executable method of the second aspect of the present invention, in an eleventh executable method of the second aspect of the present invention, the first ratio is 80%.

According to the second aspect of the present invention or any one of the first executable method to the eleventh executable method of the second aspect of the present invention, in a twelfth executable method of the second aspect of the present invention, the first camera device and the second camera device are specifically for simultaneously capturing one common two-dimensional image and one infrared image of the calibration object.

According to the second aspect of the present invention or any one of the first executable method to the twelfth executable method of the second aspect of the present invention, in a thirteenth executable method of the second aspect of the present invention, the first processor is specifically for calculating, according to the coordinates of the first pattern in the common two-dimensional image, the coordinates of the first pattern in the global coordinate system, and a mapping relationship between a coordinate system of the common two-dimensional image and the global coordinate system, the intrinsic parameters of the first camera device capturing the common two-dimensional image; the first processor is specifically for calculating, according to the coordinates of the first pattern in the infrared image, the coordinates of the first pattern in the global coordinate system, and a mapping relationship between a coordinate system of the infrared image and the global coordinate system, the intrinsic parameters of the second camera device capturing the infrared image.

According to the second aspect of the present invention or any one of the first executable method to the thirteenth executable method of the second aspect of the present invention, in a fourteenth executable method of the second aspect of the present invention, the first processor is further for optimizing the intrinsic parameters of the first camera device according to a difference between real coordinates of the first pattern and coordinates of the first pattern obtained from calculating the intrinsic parameters of the first camera device, and for optimizing the intrinsic parameters of the second camera device according to a difference between the real coordinates of the first pattern and coordinates of the first pattern obtained from calculating the intrinsic parameters of the second camera device. In addition, distortion coefficients can be optimized according to the difference between the real coordinates of the first pattern and the coordinates of the first pattern calculated by the intrinsic parameters of the camera device.

According to the second aspect of the present invention or any one of the first executable method to the fourteenth executable method of the second aspect of the present invention, in a fifteenth executable method of the second aspect of the present invention, the first processor is further for calculating a relative rotation matrix between the first camera device and the second camera device according to a rotation matrix from the global coordinate system to the coordinate system of the first camera device and a rotation matrix from the global coordinate system to the coordinate system of the second camera device; the first processor is further for calculating a relative translation matrix between the first camera device and the second camera device according to a translation matrix from the global coordinate system to the coordinate system of the first camera device, a translation matrix from the global coordinate system to the coordinate system of the second camera device, and the relative rotation matrix between the first camera device and the second camera device.

According to the second aspect of the present invention or any one of the first executable method to the fifteenth executable method of the second aspect of the present invention, in a sixteenth executable method of the second aspect of the present invention, the common two-dimensional image includes a black-and-white or a color image.

A device for calibration is provided according to a third aspect of the present invention. The device includes: an acquisition module, for acquiring a common two-dimensional image and an infrared image of a calibration object, wherein the calibration object carries a first pattern; a second processor, for calculating coordinates of the first pattern in the common two-dimensional image according to the common two-dimensional image, acquiring coordinates of the first pattern in a global coordinate system, and calculating, according to the coordinates of the first pattern in the common two-dimensional image and the coordinates of the first pattern in the global coordinate system, intrinsic parameters of the first camera device capturing the common two-dimensional image; the second processor further for calculating coordinates of the first pattern in the infrared image according to the infrared image, acquiring the coordinates of the first pattern in the global coordinate system, and calculating, according to the coordinates of the first pattern in the infrared image and the coordinates of the first pattern in the global coordinate system, intrinsic parameters of the second camera device capturing the infrared image.

According to the third aspect of the present invention, in a first executable method of the third aspect of the present invention, the common two-dimensional image of the calibration object includes at least three equal-sized calibration boards, and the infrared image of the calibration object includes at least three equal-sized calibration boards, wherein the first patterns carried by the at least three calibration boards are identical; the first pattern includes first circular points or first ellipsoidal points distributed on the calibration board, and a difference between grayscale values of the first circular points or the first ellipsoidal points and a background of the calibration board is greater than a first threshold.

According to the first executable method of the third aspect of the present invention, in a second executable method of the third aspect of the present invention, the first circular points or the first ellipsoidal points are evenly distributed in rows and columns on the calibration board.

According to the first executable method or the second executable method of the third aspect of the present invention, in a third executable method of the third aspect of the present invention, the acquisition module is specifically for acquiring coordinates of centers of the first circular points or the first ellipsoidal points in the global coordinate system; the second processor is specifically for detecting coordinates of the centers of the first circular points or the first ellipsoidal points in the common two-dimensional image; and the second processor is specifically for detecting coordinates of the centers of the first circular points or the first ellipsoidal points in the infrared image.

According to the third aspect of the present invention, or any one of the first executable method to the third executable method of the third aspect of the present invention, in a fourth executable method of the third aspect of the present invention, the coordinates of the same first pattern in the common two-dimensional image correspond to the coordinates of the first pattern in the infrared image.

According to any one of the first executable method to the fourth executable method of the third aspect of the present invention, in a fifth executable method of the third aspect of the present invention, the common two-dimensional image of the calibration object includes four equal-sized calibration boards, the infrared image of the calibration object includes four equal-sized calibration boards, and the four calibration boards are arranged in two columns and two rows; with the first camera device facing the four calibration boards, positions of the four calibration boards are defined as upper-left, upper-right, lower-left and lower-right, wherein for each calibration board, a vertical center axis thereof is defined as a vertical rotation axis, from which a downward direction is a positive direction of the vertical rotation axis, and a horizontal center axis thereof is defined as a horizontal rotation axis, from which a right direction is a positive direction of the horizontal rotation axis. A plane where the upper-left calibration is located is parallel to an imaging plane of the first camera device, the upper-right calibration board is rotated clockwise around the vertical rotation axis thereof by a first angle, the lower-left calibration board is rotated counterclockwise around the vertical rotation axis thereof by the first angle, and the lower-right calibration board is rotated counterclockwise around the horizontal rotation axis thereof by the first angle.

According to the fifth executable method of the third aspect of the present invention, in a sixth executable method of the third aspect of the present invention, the first angle is 30 degrees.

According to the third aspect of the present invention, or any one of the first executable method to the sixth executable method of the third aspect of the present invention, in a seventh executable method of the third aspect of the present invention, the common two-dimensional image of the calibration object comprises a pattern indicating a placement direction of the calibration object.

According to the seventh executable method of the third aspect of the present invention, in an eighth executable method of the third aspect of the present invention, the pattern indicating the placement direction of the calibration object may include one of: a first number of second circular points arranged in one row and a second number of second circular points arranged in another row; the first number of second circular points arranged in one column, and the second number of second circular points arranged in another column; and the second circular points are arranged so as to form a pattern indicating the placement direction of the calibration object.

According to the third aspect of the present invention, or any one of the first executable method to the eighth executable method of the third aspect of the present invention, in a ninth executable method of the third aspect of the present invention, the first camera device capturing the common two-dimensional image and the second camera device capturing the infrared image have different fields of view.

According to the third aspect of the present invention, or any one of the first executable method to the ninth executable method of the third aspect of the present invention, in a tenth executable method of the third aspect of the present invention, an image captured by, between the first camera device capturing the common two-dimensional image and the second camera device capturing the infrared image, the camera device having a greater field of view includes an image of the entire calibration object; the image of the calibration object occupies a middle part of the common two-dimensional image, and occupies more than a first ratio of the common two-dimensional image; the image of the calibration object occupies a middle part of the infrared image, and occupies more than the first ratio of the infrared image.

According to the tenth executable method of the third aspect of the present invention, in an eleventh executable method of the third aspect of the present invention, the first ratio is 80%.

According to the third aspect of the present invention, or any one of the first executable method to the eleventh executable method of the third aspect of the present invention, in a twelfth executable method of the third aspect of the present invention, the acquisition module is specifically for simultaneously capturing one common two-dimensional image and one infrared image of the calibration object.

According to the third aspect of the present invention, or any one of the first executable method to the twelfth executable method of the third aspect of the present invention, in a thirteenth executable method of the third aspect of the present invention, the second processor is specifically for calculating, according to the coordinates of the first pattern in the common two-dimensional image, the coordinates of the first pattern in the global coordinate system, and a mapping relationship between a coordinate system of the common two-dimensional image and the global coordinate system, the intrinsic parameters of the first camera device capturing the common two-dimensional image; the second processor is specifically for calculating, according to the coordinates of the first pattern in the infrared image, the coordinates of the first pattern in the global coordinate system, and a mapping relationship between a coordinate system of the infrared image and the global coordinate system, the intrinsic parameters of the second camera device capturing the infrared image.

According to the third aspect of the present invention, or any one of the first executable method to the thirteenth executable method of the third aspect of the present invention, in a fourteenth executable method of the third aspect of the present invention, the second processor is further for optimizing the intrinsic parameters of the first camera device according to a difference between real coordinates of the first pattern and coordinates of the first pattern obtained from calculating the intrinsic parameters of the first camera device, and for optimizing the intrinsic parameters of the second camera device according to a difference between the real coordinates of the first pattern and coordinates of the first pattern obtained from calculating the intrinsic parameters of the second camera device. In addition, the second processor is further for optimizing distortion coefficients according to the difference between the real coordinates of the first pattern and the coordinates of the first pattern calculated by the intrinsic parameters of the camera device.

According to the third aspect of the present invention, or any one of the first executable method to the fourteenth executable method of the third aspect of the present invention, in a fifteenth executable method of the third aspect of the present invention, the second processor is further for calculating a relative rotation matrix between the first camera device and the second camera device according to a rotation matrix from the global coordinate system to the coordinate system of the first camera device and a rotation matrix from the global coordinate system to the coordinate system of the second camera device, and calculating a relative translation matrix between the first camera device and the second camera device according to a translation matrix from the global coordinate system to the coordinate system of the first camera device, a translation matrix from the global coordinate system to the coordinate system of the second camera device, and the relative rotation matrix between the first camera device and the second camera device.

According to the third aspect of the present invention, or any one of the first executable method to the fifteenth executable method of the third aspect of the present invention, in a sixteenth executable method of the third aspect of the present invention, the common two-dimensional image includes a black-and-white image or a color image.

A computer-readable storage medium is provided according to a fifth embodiment of the present invention. The computer-readable storage medium stores a computer program. When executed by a third processor, the computer program realizes the steps of the method of any one executable method of the first executable method of the first aspect of the present invention to the sixteenth executable method of the first aspect of the present invention.

A device for calibration is provided according to a sixth aspect of the present invention. The device includes a memory, a fourth processor, and a computer program that is stored in the memory and can be run by the fourth processor. When executed by the fourth processor, the computer program can realize the steps of the method of any one executable method of the first executable method of the first aspect of the present invention to the sixteenth executable method of the first aspect of the present invention.

The method and device for calibration provided by the present invention can enhance calibration efficiency by a simple calibration method when calibrating a depth camera device.

DETAILED DESCRIPTION OF THE EMBODIMENTS

Figure 1:
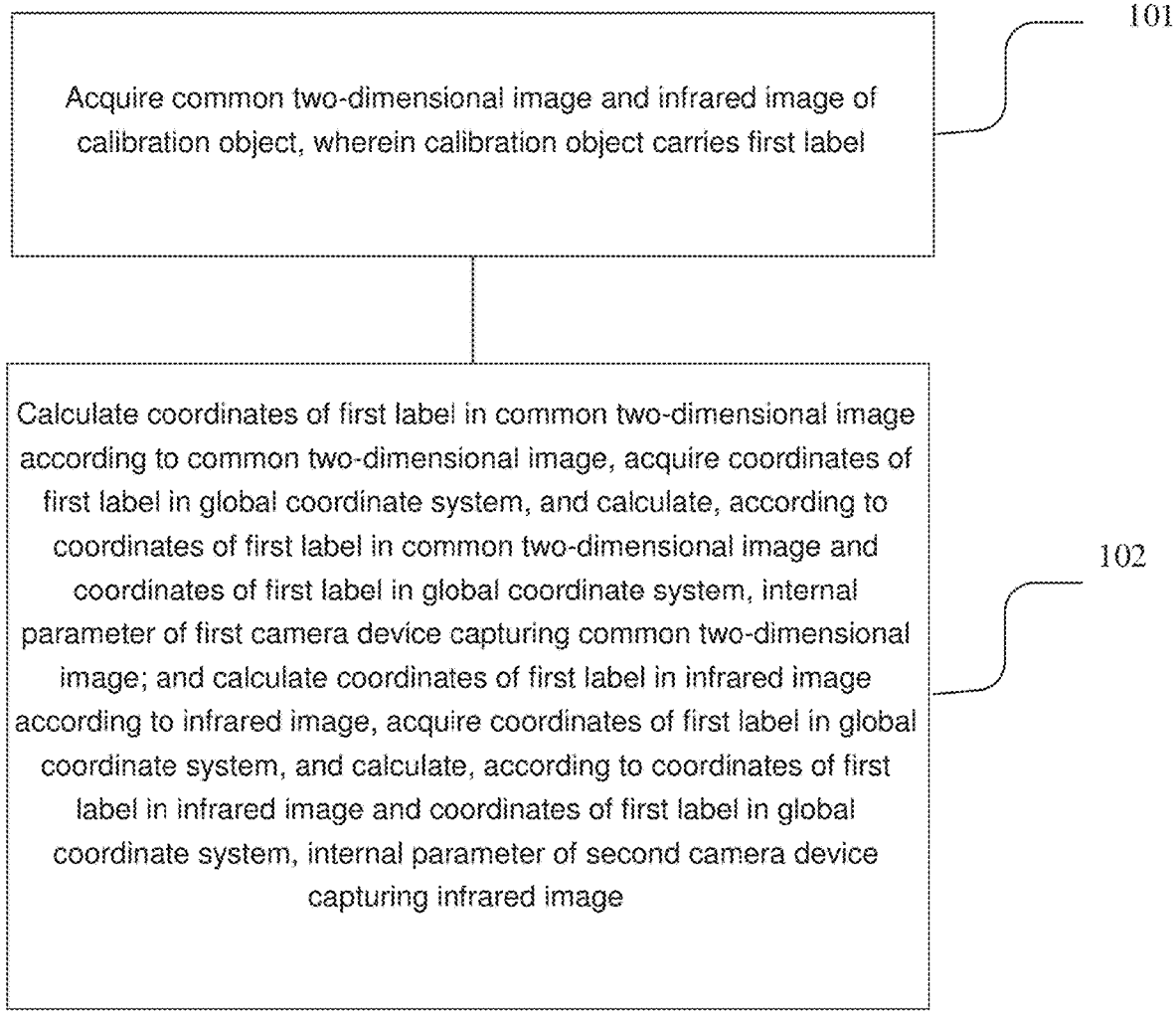
FIG. 1 is a flowchart of a method for calibration provided according to a first embodiment of the present invention.

Details of the technical solutions of the present invention are given in the embodiments of the present invention with the accompanying drawings below.

The terms "first" and "second" in the description and claims of the present invention are for distinguishing different objects rather than limiting a specific order.

The term "and/or" in the embodiments of the present invention merely describes an association relationship of associated objects, and represents three possible relationship, for example, A and/or B can represent that A exists independently, A and B exist simultaneously, and B exists independently.

In the embodiments of the present invention, terms such as "illustrative" or "exemplary" represent examples, instances or illustrations. Any embodiment or design solution described as "illustrative" or "exemplary" should not be interpreted as being more preferred or more advantageous over other embodiments or design solutions. More specifically, the use of terms such as "illustrative" or "exemplary" is specifically for presenting associated concepts.

It should be noted that, for clarity and brevity of the drawings, elements in the drawings are not necessarily drawn to actual scales. For example, for clarity, size of certain elements can be enlarged compared to other elements. Further, when appropriate, denotations can be repeated in the drawings to indicate corresponding or similar elements.

The method and the device for calibration described in the present invention can be used for calibrating a camera device group, for example, applicable to a camera device group consisting of a camera device for capturing a common two-dimensional image and a camera device for capturing an infrared image; for example, a camera device group for measuring depth, and the camera device group for measuring depth can be a structured light type, a time-of-flight (TOF) type or a binocular stereo imaging type. The above camera device group for measuring depth can be installed to a camera, a cell phone or a tablet computer. The structured light type camera device group for measuring depth may include an infrared transmitter, an infrared camera device and an RGB camera device; the TOF type camera device group for measuring depth may include an infrared transmitter, an infrared camera and an RGB camera; the binocular stereo imaging type camera group for measuring depth may include an infrared transmitter, two infrared camera devices and an RGB camera device.

A method for calibration provided according to an embodiment of the present invention is described in detail with reference to FIG. 1 below. As shown in FIG. 1, the method includes the following steps.

In step 101, a common two-dimensional image and an infrared image of a calibration object are acquired, wherein the calibration object carries a first pattern.

The common two-dimensional image may be captured by a first camera device, and the infrared image may be captured by a second camera device. The common two-dimensional image includes a black-and-white image or a color image, and the color image may be a red/green/blue (RGB) image.

Selectively, the step of acquiring may be acquiring from a storage device, and the storage device may be a random-access memory (RAM) or a flash memory.

Selectively, the step of acquiring the common two-dimensional image and the infrared image of the calibration object may include: simultaneously capturing one common two-dimensional image and one infrared image of the calibration object. It should be noted that, the term "simultaneously" does not strictly mean the same moment, and may be approximately the same time; that is, compared to the prior art in which a first camera device and a second camera device are required to respectively sequentially capture the calibration object, the first camera device and the second camera device of the present invention are not required to respectively sequentially capture the calibration object, thus enhancing the calibration efficiency.

Selectively, the calibration object includes at least three equal-sized calibration boards, wherein the first patterns carried by the at least three calibration boards are identical, the first pattern includes first circular points or first ellipsoidal points distributed on the calibration board, and a difference between grayscale values of the first circular points or the first ellipsoidal points and a background of the calibration board is greater than a first threshold. Selectively, when the calibration object includes three equal-sized calibration boards, the three equal-sized calibration boards may be arranged at positions forming an upright triangle, that is, one of the three equal-sized calibration boards is arranged right above the middle of the two other calibration boards arranged side by side below. Selectively, the first threshold is 80. For example, the first circular points or the first ellipsoidal points are black with a grayscale value of less than 100, and the background of the calibration board can be white with a grayscale value of more than 180. Selectively, a long side of the calibration board is parallel to the first camera device and the second camera device.

Figure 2:
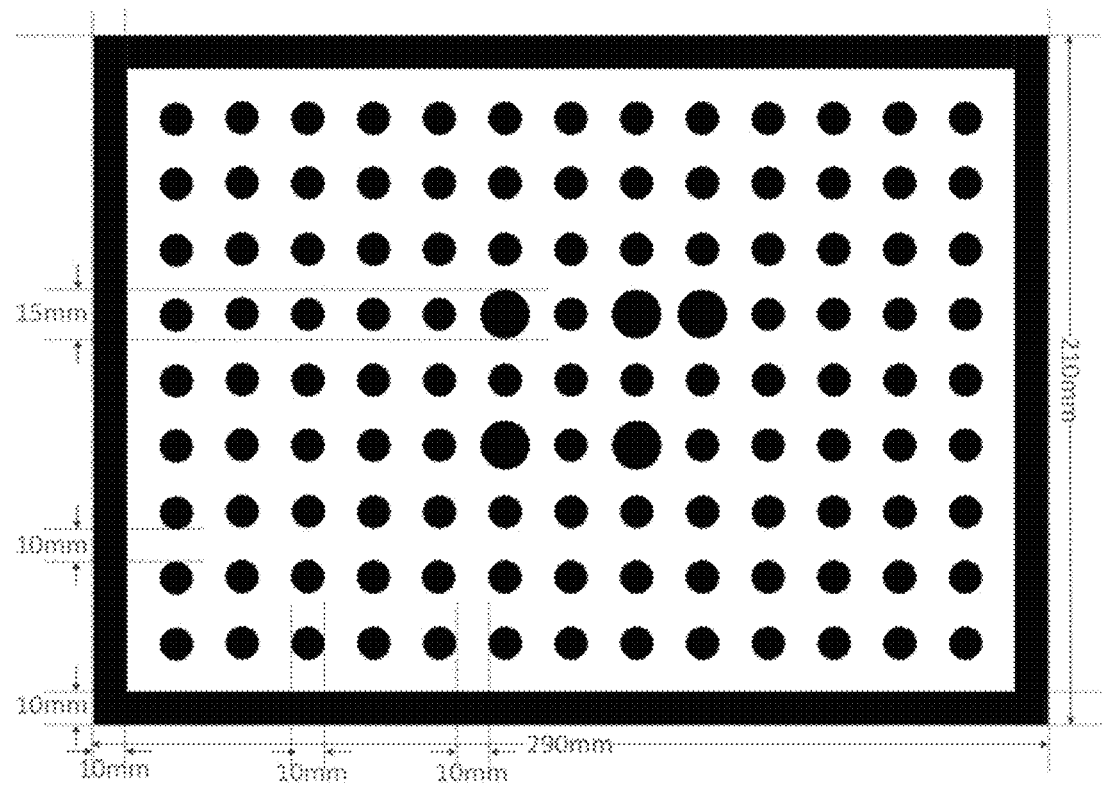
FIG. 2 is a schematic diagram of a calibration board provided according to the first embodiment of the present invention.

Selectively, the first circular points and or the first ellipsoidal points are evenly distributed in rows and columns on the calibration board, as shown in FIG. 2. Selectively, a calibration image on the calibration board may have a frame, which may be black. Selectively, the calibration image has a length of 290 mm and a width of 210 mm. In FIG. 2, the first pattern are small circular points having a diameter of 10 mm, and a distance between the small circular points is 10 mm. The black frame in the calibration image has a width of 10 mm. In the calibration image, there are 13 circular points on the long side, and 9 circular points on the short side.

Figure 3:
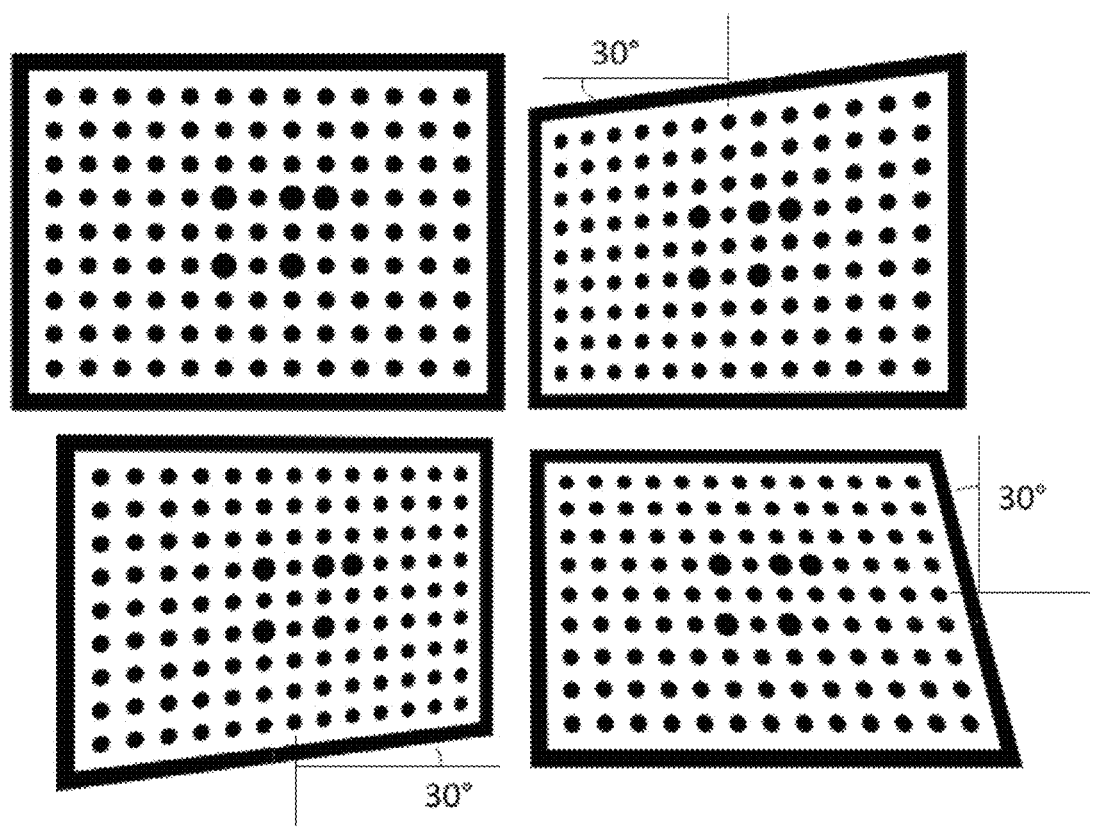
FIG. 3 is a schematic diagram of imaging of a calibration board provided according to the first embodiment of the present invention.

Preferably, the calibration object includes four equal-sized calibration boards, and the four calibration boards are arranged in two columns and two rows; with the first camera device facing the four calibration boards, positions of the four calibration boards are defined as upper-left, upper-right, lower-left and lower-right, wherein for each calibration board, a vertical center axis thereof is defined as a vertical rotation axis, from which a downward direction is a positive direction of the vertical rotation axis, and a horizontal center axis thereof is defined as a horizontal rotation axis, from which a right direction is a positive direction of the horizontal rotation axis. A plane where the upper-left calibration is located is parallel to an imaging plane of the first camera device, the upper-right calibration board is rotated clockwise around the vertical rotation axis thereof by a first angle, the lower-left calibration board is rotated counterclockwise around the vertical rotation axis thereof by the first angle, and the lower-right calibration board is rotated counterclockwise around the horizontal rotation axis thereof by the first angle. The features "with the first camera device facing the four calibration boards, and positions of the four calibration boards are defined as upper-left, upper-right, lower-left and lower-right" serve descriptive purposes for naming the four calibration boards, and are not to be construed as limitations to the present invention. As shown in FIG. 3, the first angle may be approximately 30 degrees with an error of 5 degrees, or may have a larger offset according to precision requirements. The descriptive terms relating to positions, such as "parallel" and "middle" are approximate description rather than strict requirements, for example, approximately parallel.

Selectively, the calibration object carries a pattern indicating a placement direction of the calibration board. The pattern indicating the placement direction of the calibration object may include one of: a first number of second circular points arranged in one row and a second number of second circular points arranged in another row; the first number of second circular points arranged in one column, and the second number of second circular points arranged in another column; and the second circular points are arranged so as to form a pattern indicating the placement direction of the calibration object. The term "one row" refers to a certain row and does not represent an order in an arrangement. For example, as shown in FIG. 2 or FIG. 3, the term "one row" may be a fourth row from top to bottom in the arrangement, and the term "another row" may be a sixth row from top to bottom in the arrangement. As shown in FIG. 2 or FIG. 3, the second circular points are the large circular points in the drawing, and the large points may have a diameter of 15 mm. Selectively, the pattern for indicating the placement direction of the calibration object as arranged by the second circular points may include: an arrow pattern or other equivalent patterns. Through the pattern indicating the placement direction of the calibration object, multiple calibration boards can be placed along the same direction.

In step 102, coordinates of the first pattern in the common two-dimensional image are calculated according to the common two-dimensional image, and coordinates of the first pattern in a global coordinate system are acquired; and intrinsic parameters of the first camera device capturing the common two-dimensional image is calculated according to the coordinates of the first pattern in the common two-dimensional image and the coordinates of the first pattern in the global coordinate system; further, coordinates of the first pattern in the infrared image are calculated according to the infrared image, and the coordinates of the first pattern in the global coordinate system are acquired; and intrinsic parameters of the second camera device capturing the infrared image is calculated according to the coordinates of the first pattern in the infrared image and the coordinates of the first pattern in the global coordinate system.

The step of calculating the intrinsic parameters of the first camera device and the step of calculating the intrinsic parameters of the second camera device may be mutually independent and are not limited to being performed in a specific order. For example, the two steps may be performed in parallel.

Figure 9:
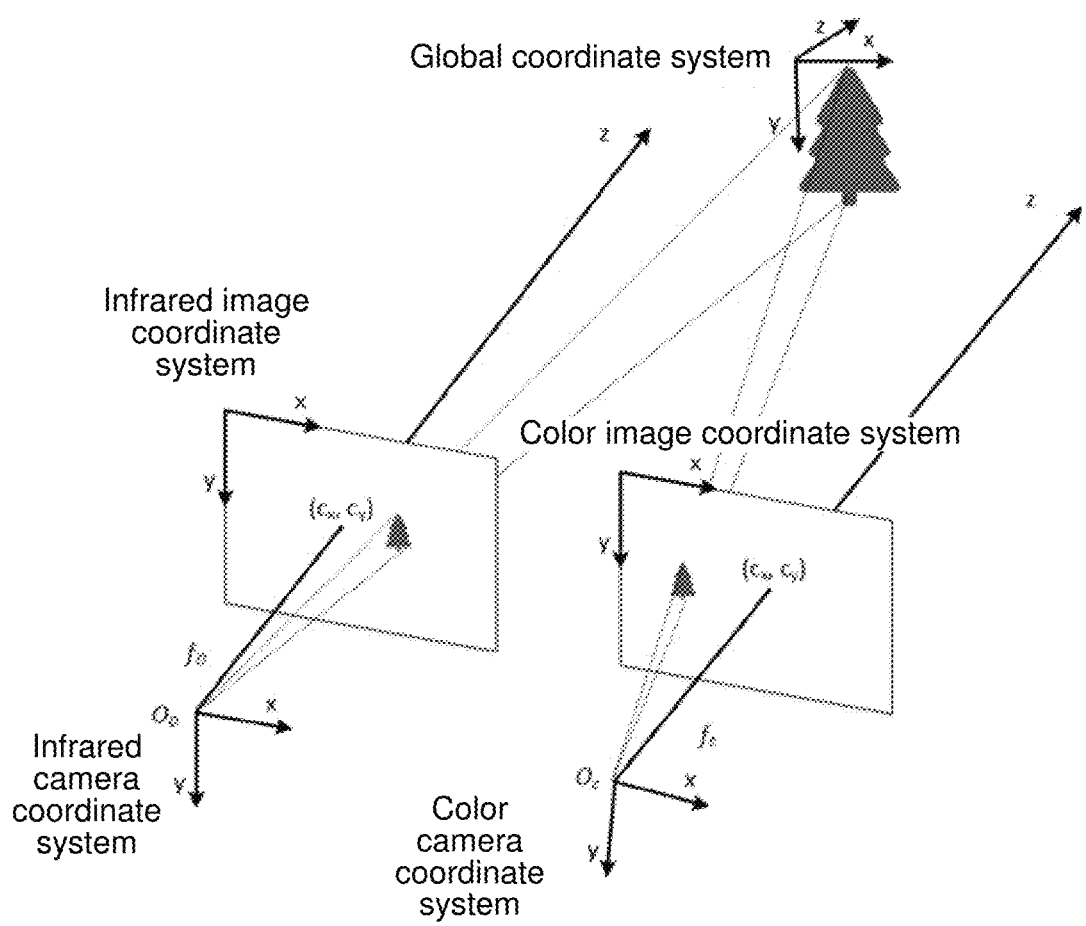
FIG. 9 is a schematic diagram of different coordinate systems according to the present invention.

The step of calculating the coordinates of the first pattern in the common two-dimensional image according to the common two-dimensional image, and the step of acquiring the coordinates of the first pattern in the global coordinate system are not limited to being performed in a specific order; the above steps of calculating and acquiring the coordinates may be simultaneously performed, the step of calculating the coordinates may be performed before the step of acquiring the coordinates, or the step of acquiring the coordinates may be performed before the step of calculating the coordinates. Similarly, the step of calculating the coordinates of the first pattern in the infrared image according to the infrared image, and the step of acquiring the coordinates of the first pattern in the global coordinate system are not limited to being performed in a specific order; the above steps of calculating and acquiring the coordinates may be simultaneously performed, the step of calculating the coordinates may be performed before the step of acquiring the coordinates, or the step of acquiring the coordinates may be performed before the step of calculating the coordinates. FIG. 9 shows a global coordinate system, an image coordinate system, and a camera device coordinate system by taking an infrared camera and an RGB camera as an example.

The step of calculating the coordinates of the first pattern in the common two-dimensional image according to the common two-dimensional image, and the step of calculating the coordinates of the first pattern in the infrared image according to the infrared image are not limited to being performed in a specific order; the step of calculating the coordinates of the first pattern in the common two-dimensional image and the step of calculating the coordinates of the first pattern in the infrared image can be performed simultaneously, the step of calculating the coordinates of the first pattern in the common two-dimensional image can be performed before the step of calculating the coordinates of the first pattern in the infrared image, or the step of acquiring the coordinates can be performed before the step of calculating the coordinates of the first pattern in the infrared image. Similarly, the step of calculating the coordinates of the first pattern in the common two-dimensional image and the step of calculating the intrinsic parameters of the second camera device capturing the infrared image are not limited to being performed in a specific order. Similarly, the step of calculating the coordinates of the first pattern in the infrared image and the step of calculating the intrinsic parameters of the first camera device capturing the common two-dimensional image are not limited to being performed in a specific order.

Selectively, in the step of calculating the coordinates of the first pattern in the infrared image according to the infrared image and acquiring the coordinates of the first pattern in the global coordinate system, if the coordinates of the first pattern in the global coordinate system are previously calculated and obtained, the step of acquiring may be reading the obtained coordinates of the first pattern in the global coordinate system. Similarly, in the step of calculating the coordinates of the first pattern in the common two-dimensional image according to the common two-dimensional image and the step of acquiring the coordinates of the first pattern in the global coordinate system, if the coordinates of the first pattern in the global coordinate system are previously calculated and obtained, the step of acquiring can be reading the obtained coordinates of the first pattern in the global coordinate system.

Selectively, the step of acquiring the coordinates of the first pattern in the global coordinate system includes: acquiring coordinates of centers of the first circular points or the first ellipsoidal points in the global coordinate system. The step of calculating the coordinates of the first pattern in the common two-dimensional image according to the common two-dimensional image includes: detecting coordinates of the centers of the first circular points or the first ellipsoidal points in the common two-dimensional image. The step of calculating the coordinates of the first pattern in the infrared image according to the infrared image includes: detecting coordinates of the centers of the first circular points or the first ellipsoidal points in the infrared image. More specifically, in this embodiment, positions of different first patterns in the calibration boards are fixed (for example, a distance between circular points in the calibration boards is fixed, and a distance between calibration boards is fixed), and relative positions of the first pattern and the camera devices are also fixed. Thus, the coordinates of the first pattern in the global coordinate system can be obtained in advance. In practice, during the calibration process, a calibration box can be used. In a calibration box, positions of the calibration boards are fixed, and positions for placing camera devices are also fixed. Selectively, taking a circular point for example, a method for calculating the center thereof may be: first converting an input image to a grayscale image that is then binarized, wherein bright areas have a grayscale value of 255 (e.g., white areas on the calibration board) and dark areas have a grayscale value of 0 (e.g., black circular points on the calibration board). A connected domain having a grayscale value of 255 in the binary image is detected. For each connected domain having a grayscale value of 255, a surrounding connecting domain having a grayscale value of 0 is detected, and it is determined whether a circle condition is satisfied. If the circle condition is satisfied, the center thereof is calculated. Circular connected domains surrounded by the same connecting domain having a grayscale value of 255 are sorted and stored according to rows.

Selectively, the first camera device and the second camera device have different fields of view. The method provided by the embodiment of the present invention can calibrate a camera device group consisting of at least two camera devices, and the fields of view of the at least two camera devices may be different.

Selectively, an image captured by, between the first camera device and the second camera device, the camera device having a greater field of view includes an image of the entire calibration object. The image of the calibration object occupies a middle part of the common two-dimensional image, and occupies more than a first ratio of the common two-dimensional image. The image of the calibration object occupies a middle part of the infrared image, and occupies more than the first ratio of the infrared image. Preferably, the first ratio may be 80%, and the first ratio may be appropriately reduced according to the calibration precision.

Figure 4:
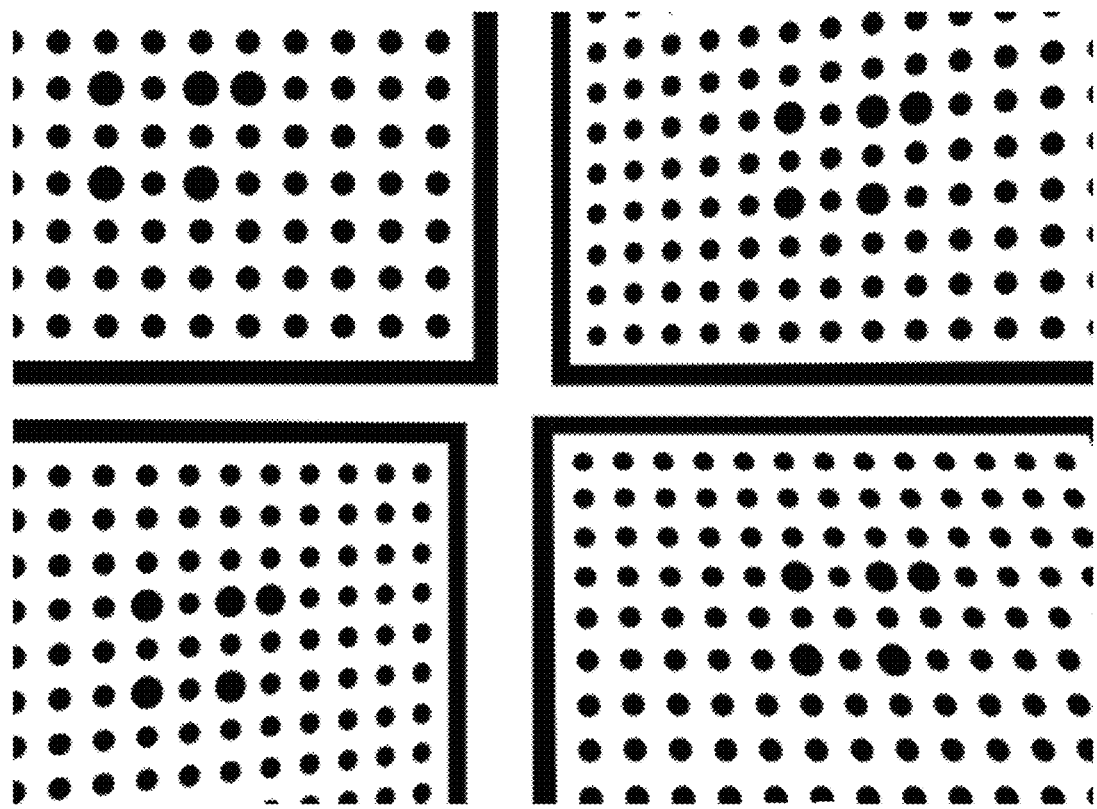
FIG. 4 is another schematic diagram of imaging of a calibration board provided according to the first embodiment of the present invention.

Selectively, as shown in FIG. 4, the image of the calibration object occupies more than the first ratio of an image captured by, between the first camera device and the second camera device, the camera device having a smaller field of view. Preferably, the first ratio may be 80%, and the first ratio may be appropriately reduced according to the calibration precision.

Preferably, the coordinates of the same first pattern in the common two-dimensional image correspond to the coordinates of the first pattern in the infrared image. More specifically, a corresponding relationship needs to be established between the coordinates of the same first pattern in the common two-dimensional image and the coordinates of the first pattern in the infrared image. The method for establishing the corresponding relationship may be performed through sorting and storing the sequences of the acquired coordinates of the first pattern in the two types of two-dimensional images.

Selectively, the step of calculating, according to the coordinates of the first pattern in the common two-dimensional image and the coordinates of the first pattern in the global coordinate system, the intrinsic parameters of the first camera device capturing the common two-dimensional image includes: calculating, according to the coordinates of the first pattern in the common two-dimensional image, the coordinates of the first pattern in the global coordinate system, and a mapping relationship between a coordinate system of the common two-dimensional image and the global coordinate system, the intrinsic parameters of the first camera device capturing the common two-dimensional image; and the step of calculating, according to the coordinates of the first pattern in the infrared image and the coordinates of the first pattern in the global coordinate system, the intrinsic parameters of the second camera device capturing the infrared image includes: calculating, according to the coordinates of the first pattern in the infrared image, the coordinates of the first pattern in the global coordinate system, and a mapping relationship between a coordinate system of the infrared image and the global coordinate system, the intrinsic parameters of the second camera device capturing the infrared image.

More specifically, the coordinates of a point in the global coordinate system can undergo rotation and translation to obtain coordinates of the point in a coordinate system of a camera device, as mathematically expressed below:

$$M_C = RM_W + T$$

In the above, R is a rotation matrix between the global coordinate system and the coordinate system of the camera device, T is a translation matrix between the global coordinate system and the coordinate system of the camera device, $M_W=(X_W, Y_W, Z_W)$ is the coordinates of the point in the global coordinate system, and $M_C=(X_C, Y_C, Z_C)$ is the coordinates of the point in the coordinate system of the camera device.

The transformation relationship between the coordinates $m=(u, v)$ of the point in a two-dimensional image and the coordinates $M_C$ of the corresponding point in a three-dimensional camera coordinate system may be represented as:

$$u=f_x*(x_d+\alpha*y_d)+c_x$$

$$v=f_y*y_d+c_y$$

In the above, $f_x$ and $f_y$ are projections of a focal length in the x direction and the y direction, $c_x$ and $c_y$ are coordinates of a main point in the x direction and the y direction, $\alpha$ is an inclination coefficient, and $x_d$ and $y_d$ are normalized coordinates by taking distortion into account and can be calculated by the following equations:

$$x = X_C/Z_C$$
$$y = Y_C/Z_C$$
$$r = \sqrt{x^2+y^2}$$
$$\begin{bmatrix} x_d \\ y_d \end{bmatrix} = (1+k_1r^2+k_2r^4+k_3r^6)\begin{bmatrix} x \\ y \end{bmatrix} + \begin{bmatrix} 2p_1xy+p_2(r^2+2x^2) \\ 2p_2xy+p_1(r^2+2y^2) \end{bmatrix}$$

In the above, $k_1$, $k_2$, $k_3$, $p_1$ and $p_2$ are distortion coefficients; the radial distortions $k_1$, $k_2$ and $k_3$ but not the tangential distortions $p_1$ and $p_2$ are considered.

Thus, the mapping relationship between a three-dimensional point in a global coordinate system and the corresponding point in a two-dimensional image is summarized as below:

$$Z_cm=A[Rt]M_W$$

In the above, $$A = \begin{bmatrix} f_x & \alpha & c_x \\ 1 & f_y & c_y \\ 0 & 0 & 1 \end{bmatrix}.$$

A uniform matrix $H=A[R\ t]$. Each calibration board may correspond to one uniform matrix. According to a constraint condition, eight constraint equations can be generated from four calibration boards, thereby solving five parameters in A, the rotation matrix and the translation matrix.

Selectively, the method further includes: optimizing the intrinsic parameters of the first camera device according to a difference between real coordinates of the first pattern and coordinates of the first pattern obtained from calculating the intrinsic parameters of the first camera device; and optimizing the intrinsic parameters of the second camera device according to a difference between the real coordinates of the first pattern and coordinates of the first pattern obtained from calculating the intrinsic parameters of the second camera device. More specifically, an error function $E=\Sigma_i|\overline{m}_i-f(A, R, t, M_i)|^2$ is established, where $f(\bullet)$ is a mapping relationship between a point in a three-dimensional global coordinate system and the corresponding point in a two-dimensional image; $\overline{m}_i$ is the coordinates of a first pattern point, such as the center of a circular point in FIG. 3, in a two-dimensional image, e.g., the common two-dimensional image or the infrared image; and $M_i$ is the real coordinates of a first pattern, e.g., the center of a circular point, in a three-dimensional global coordinate system. Through optimization, the error function E is minimized to thereby acquire more accurate internal reference, external reference and distortion parameters for a camera. For example, the optimization may be a least square method. Selectively, the error function may also be established through the real coordinates of the first pattern in a three-dimensional global coordinate system, and a difference between coordinates in a two-dimensional image and three-dimensional coordinates in the three-dimensional global coordinate system calculated from a mapping relationship of the coordinates in the two-dimensional image and the three-dimensional global coordinate system.

Selectively, the intrinsic parameters of the first camera device include a rotation matrix and a translation matrix from the global coordinate system to the coordinate system of the first camera device; the intrinsic parameters of the second camera device includes a rotation matrix and a translation matrix from the global coordinate system to the coordinate system of the second camera device. Further, the method further includes: calculating a relative rotation matrix between the first camera device and the second camera device according to the rotation matrix from the global coordinate system to the coordinate system of the first camera device and the rotation matrix from the global coordinate system to the coordinate system of the second camera device; and calculating a relative translation matrix between the first camera device and the second camera device according to the translation matrix from the global coordinate system to the coordinate system of the first camera device, the translation matrix from the global coordinate system to the coordinate system of the second camera device, and the relative rotation matrix between the first camera device and the second camera device.

More specifically, according to respective translation matrices and rotation matrices of the first camera device (which may be an RGB camera device) and the infrared camera device obtained, a relative attitude of the two cameras can be acquired according to the following equations:

$$R_{relative}=R_{rgb}(R_{IR})^T$$

$$T_{relative}=T_{rgb}-R_{relative}T_{IR}$$

In the above, $R_{relative}$ is the relative rotation matrix between the two cameras, $T_{relative}$ is the relative translation matrix between the two cameras, $R_{rgb}$ represents the rotation matrix from the global coordinate system to the RGB camera device, $R_{IR}$ represents the rotation matrix from the global coordinate system to the infrared camera device, $T_{rgb}$ represents the translation matrix from the global coordinate system to the RGB camera device, and $T_{IR}$ represents the translation matrix from the global coordinate system to the IR camera device. Selectively, a reprojection error equation may be established and optimized; that is, an equation between two corresponding cameras can be established and optimized to acquire more accurate relative external reference.

Selectively, regarding a binocular stereo imaging type depth camera device, the device includes two infrared camera devices and an RGB camera device, and two rounds of calibration needs to be performed according to the method provided by the present invention, respectively by: (1) two infrared camera devices (including internal reference and relative external reference); (2) one of the infrared camera devices and one RGB camera device (internal reference and external reference). First, an infrared image is collected using an infrared mirror device having a visual angle consistent with a depth image, and a color image is at the same time acquired. The foregoing method is performed to acquire respective internal reference and external reference of the infrared mirror device and the RGB camera device to align the depth image and the color image. An infrared image is acquired simultaneously by each of the two infrared camera devices. The foregoing method is repeated to acquire respective internal reference and external reference of the two infrared camera devices for use of calculation of the depth image.

The method and device for calibration provided by the present invention can enhance calibration efficiency by a simple calibration method when calibrating a depth camera device.

Figure 5:
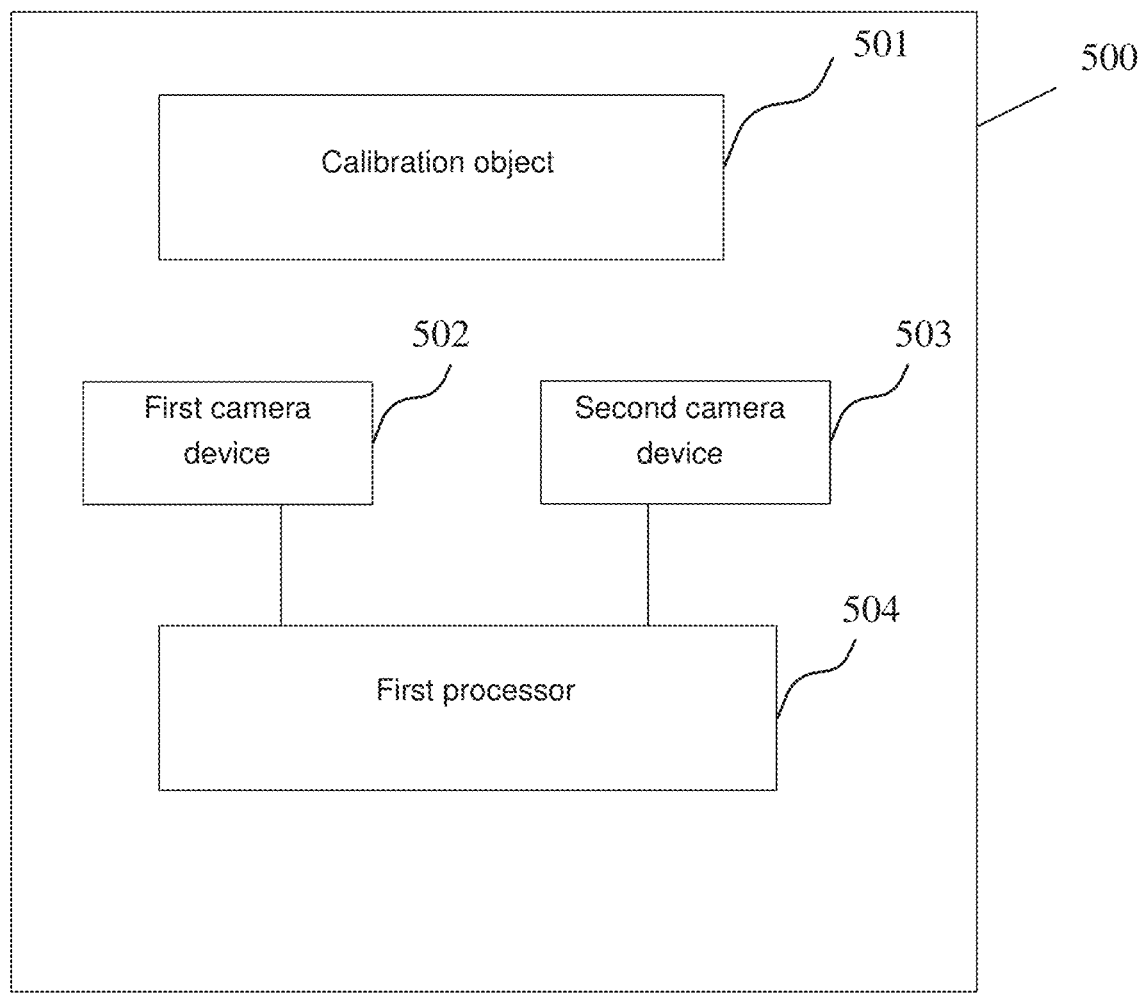
FIG. 5 is a block diagram of a system for calibration provided according to a second embodiment of the present invention.

A system 500 for calibration provided according to a second embodiment of the present invention is described in detail with FIG. 5 below. As shown in FIG. 5, the system 500 includes a calibration object 501, a first camera device 502, a second camera device 503, and a first processor 504.

The first camera device 502 is for capturing a common two-dimensional image of the calibration object 501, wherein the calibration object 501 carries a first pattern. The second camera device 503 is for capturing an infrared image of the calibration object 501.

The first processor 504 is for calculating coordinates of the first pattern in the common two-dimensional image according to the common two-dimensional image, acquiring coordinates of the first pattern in a global coordinate system, and calculating, according to the coordinates of the first pattern in the common two-dimensional image and the coordinates of the first pattern in the global coordinate system, intrinsic parameters of the first camera device capturing the common two-dimensional image.

Moreover, the first processor 503 is further for calculating coordinates of the first pattern in the infrared image according to the infrared image, acquiring the coordinates of the first pattern in the global coordinate system, and calculating, according to the coordinates of the first pattern in the infrared image and the coordinates of the first pattern in the global coordinate system, intrinsic parameters of the second camera device capturing the infrared image.

Selectively, the common two-dimensional image includes a black-and-white image or a color image, and the color image may be an RGB image.

The first camera device and the second camera device are specifically for simultaneously capturing one common two-dimensional image and one infrared image of the calibration object. It should be noted that, the term "simultaneously" is not strictly the same moment, and may be approximately the same time; that is, compared to the prior art in which a first camera device and a second camera device are required to respectively sequentially capture the calibration object, the first camera device and the second camera device of the present invention are not required to respectively sequentially capture the calibration object, thus enhancing the calibration efficiency.

Selectively, the calibration object includes at least three equal-sized calibration boards, wherein the first patterns carried by the at least three calibration boards are identical. The first pattern includes first circular points or first ellipsoidal points distributed on the calibration board, and a difference between grayscale values of the first circular points or the first ellipsoidal points and a background of the calibration board is greater than a first threshold. Selectively, when the calibration object includes three equal-sized calibration boards, the three equal-sized calibration boards may be arranged at positions forming an upright triangle, that is, one of the three equal-sized calibration boards is arranged right above the middle of the two other calibration boards arranged side by side below. Selectively, the first threshold is 80. For example, the first circular points or the first ellipsoidal points are black with a grayscale value of less than 100, and the background of the calibration board can be white with a grayscale value of more than 180. Selectively, a long side of the calibration board is parallel to the first camera device and the second camera device.

Selectively, the first circular points or the first ellipsoidal points are evenly distributed in rows and columns on the calibration board, as shown in FIG. 2. Selectively, a calibration image of on the calibration board may have a frame, which may be black. Selectively, the calibration image has a length of 290 mm and a width of 210 mm. In FIG. 2, the first pattern are small circular points having a diameter of 10 mm, and a distance between the small circular points is 10 mm. The black frame in the calibration image has a width of 10 mm. In the calibration image, there are 13 circular points on the long side, and 9 circular points on the short side.

The calibration object includes four equal-sized calibration boards, and the four calibration boards are arranged in two columns and two rows; with the first camera device facing the four calibration boards, positions of the four calibration boards are defined as upper-left, upper-right, lower-left and lower-right, wherein for each calibration board, a vertical center axis thereof is defined as a vertical rotation axis, from which a downward direction is a positive direction of the vertical rotation axis, and a horizontal center axis thereof is defined as a horizontal rotation axis, from which a right direction is a positive direction of the horizontal rotation axis. A plane where the upper-left calibration is located is parallel to an imaging plane of the first camera device, the upper-right calibration board is rotated clockwise around the vertical rotation axis thereof by a first angle, the lower-left calibration board is rotated counterclockwise around the vertical rotation axis thereof by the first angle, and the lower-right calibration board is rotated counterclockwise around the horizontal rotation axis thereof by the first angle. The features "with the first camera device facing the four calibration boards, positions of the four calibration boards are defined as upper-left, upper-right, lower-left and lower-right" serve descriptive purposes for naming the four calibration boards, and are not to be construed as limitations to the present invention. As shown in FIG. 3, the first angle may be approximately 30 degrees with an error of 5 degrees, or may have a larger offset according to precision requirements. The descriptive terms relating to positions, such as "parallel" and "middle" are approximate description rather than strict requirements, for example, approximately parallel.

The calibration object carries a pattern indicating a placement direction of the calibration board. The pattern indicating the placement direction of the calibration object may include one of: a first number of second circular points arranged in one row and a second number of second circular points arranged in another row; the first number of second circular points arranged in one column, and the second number of second circular points arranged in another column; and the second circular points are arranged so as to form a pattern indicating the placement direction of the calibration object. The term "one row" refers to a certain row and does not represent an order in an arrangement. For example, as shown in FIG. 2 or FIG. 3, the term "one row" may be a fourth row from top to bottom in the arrangement, and the term "another row" may be a sixth row from top to bottom in the arrangement. As shown in FIG. 2 or FIG. 3, the second circular points are the large circular points in the drawing, and the large circular points may have a diameter of 15 mm. Selectively, the pattern indicating the placement direction of the calibration object as arranged by the second circular points may include: an arrow pattern or other equivalent patterns. Through the pattern indicating the placement direction of the calibration object, multiple calibration boards can be placed along the same direction.

The step of calculating the intrinsic parameters of the first camera device and the step of calculating the intrinsic parameters of the second camera device may be mutually independent and are not limited to being performed in a specific order. For example, the two steps may be performed in parallel.

The step of calculating the coordinates of the first pattern in the common two-dimensional image according to the common two-dimensional image, and the step of acquiring the coordinates of the first pattern in the global coordinate system are not limited to being performed in a specific order; the above steps of calculating and acquiring the coordinates may be simultaneously performed, the step of calculating the coordinates may be performed before the step of acquiring the coordinates, or the step of acquiring the coordinates may be performed before the step of calculating the coordinates. Similarly, the step of calculating the coordinates of the first pattern in the infrared image according to the infrared image, and the step of acquiring the coordinates of the first pattern in the global coordinate system are not limited to being performed in a specific order; the above steps of calculating and acquiring the coordinates may be simultaneously performed, the step of calculating the coordinates may be performed before the step of acquiring the coordinates, or the step of acquiring the coordinates may be performed before the step of calculating the coordinates. FIG. 9 shows a global coordinate system, an image coordinate system, and a camera device coordinate system by taking an infrared camera and an RGB camera as an example.

The step of calculating the coordinates of the first pattern in the common two-dimensional image according to the common two-dimensional image, and the step of calculating the coordinates of the first pattern in the infrared image according to the infrared image are not limited to being performed in a specific order; the step of calculating the coordinates of the first pattern in the common two-dimensional image and the step of calculating the coordinates of the first pattern in the infrared image can be performed simultaneously, the step of calculating the coordinates of the first pattern in the common two-dimensional image can be performed before the step of calculating the coordinates of the first pattern in the infrared image, or the step of acquiring the coordinates can be performed before the step of calculating the coordinates of the first pattern in infrared image. Similarly, the step of calculating the coordinates of the first pattern in the common two-dimensional image and the step of calculating the intrinsic parameters of the second camera device capturing the infrared image are not limited to being performed in a specific order. Similarly, the step of calculating the coordinates of the first pattern in the infrared image and the step of calculating the intrinsic parameters of the first camera device capturing the common two-dimensional image are not limited to being performed in a specific order.

Selectively, in the step of calculating the coordinates of the first pattern in the infrared image according to the infrared image and acquiring the coordinates of the first pattern in the global coordinate system, if the coordinates of the first pattern in the global coordinate system are previously calculated and obtained, the step of acquiring may be reading the obtained coordinates of the first pattern in the global coordinate system. Similarly, in the step of calculating the coordinates of the first pattern in the common two-dimensional image according to the common two-dimensional image and the step of acquiring the coordinates of the first pattern in the global coordinate system, if the coordinates of the first pattern in the global coordinate system are previously calculated and obtained, the step of acquiring can be reading the obtained coordinates of the first pattern in the global coordinate system.

The first processor is specifically for acquiring coordinates of centers of the first circular points or the first ellipsoidal points in the global coordinate system. The first processor is specifically for detecting coordinates of the centers of the first circular points or the first ellipsoidal points in the common two-dimensional image. The first processor is specifically for detecting coordinates of the centers of the first circular points or the first ellipsoidal points in the infrared image. More specifically, in this embodiment, the positions of different first patterns in the calibration boards are fixed (for example, a distance between circular points in the calibration boards is fixed, and a distance between calibration boards is fixed), and relative positions of the first pattern and the camera devices are also fixed. Thus, the coordinates of the first pattern in the global coordinate system can be obtained in advance. In practice, during the calibration process, a calibration box can be used. In a calibration box, positions of the calibration boards are fixed, and positions for placing camera devices are also fixed. Selectively, taking a circular point for example, a method for calculating the center thereof may be: first converting an input image to a grayscale image that is then binarized, wherein bright areas have a grayscale value of 255 (e.g., white areas on the calibration board) and dark areas have a grayscale value of 0 (e.g., black circular points on the calibration board). A connected domain having a grayscale value of 255 in the binary image is detected. For each connected domain having a grayscale value of 255, a surrounding connecting domain having a grayscale value of 0 is detected, and it is determined whether a circle condition is satisfied. If the circle condition is satisfied, the center thereof is calculated. Circular connected domains surrounded by the same connecting domain having a grayscale value of 255 are sorted and stored according to rows.

Selectively, the first camera device and the second camera device have different fields of view. The method provided by the embodiment of the present invention can calibrate a camera device group consisting of at least two camera devices, and the fields of view of the at least two camera devices may be different.

Selectively, an image captured by, between the first camera device and the second camera device, the camera device having a greater field of view includes an image of the entire calibration object. The image of the calibration object occupies a middle part of the common two-dimensional image, and occupies more than a first ratio of the common two-dimensional image. The image of the calibration object occupies a middle part of the infrared image, and occupies more than the first ratio of the infrared image. Preferably, the first ratio may be 80%, and the first ratio may be appropriately reduced according to the calibration precision.

Selectively, as shown in FIG. 4, the image of the calibration object occupies more than the first ratio of an image captured by, between the first camera device and the second camera device, the camera device having a smaller field of view. Preferably, the first ratio may be 80%, and the first ratio may be appropriately reduced according to the calibration precision.

Selectively, the coordinates of the same first pattern in the common two-dimensional image correspond to the coordinates of the first pattern in the infrared image. More specifically, a corresponding relationship needs to be established between the coordinates of the same first pattern in the common two-dimensional image and the coordinates of the first pattern in the infrared image. The method for establishing the corresponding relationship may be performed through sorting and storing the sequences of the acquired coordinates of the first pattern in the two types of two-dimensional images.

The first processor is specifically for calculating, according to the coordinates of the first pattern in the common two-dimensional image, the coordinates of the first pattern in the global coordinate system, and a mapping relationship between a coordinate system of the common two-dimensional image and the global coordinate system, the intrinsic parameters of the first camera device capturing the common two-dimensional image. The first processor is specifically for calculating, according to the coordinates of the first pattern in the infrared image, the coordinates of the first pattern in the global coordinate system, and a mapping relationship between a coordinate system of the infrared image and the global coordinate system, the intrinsic parameters of the second camera device capturing the infrared image.

More specifically, the coordinates of a point in the global coordinate system can undergo rotation and translation to obtain coordinates of the point in a coordinate system of a camera device, as mathematically expressed below:

$$M_C = RM_W + T$$

In the above equation, R is a rotation matrix between the global coordinate system and the coordinate system of the camera device, T is a translation matrix between the global coordinate system and the coordinate system of the camera device, $M_W=(X_W, Y_W, Z_W)$ is the coordinates of the point in the global coordinate system, and $M_C=(X_C, Y_C, Z_C)$ is the coordinates of the point in the coordinate system of the camera device.

The transformation relationship between the coordinates $m=(u, v)$ of the point in a two-dimensional image and the coordinates $M_C$ of the corresponding point in a three-dimensional camera coordinate system may be represented as:

$$u = f_x^* (x_d + \alpha^* y_d) + c_x$$

$$v = f_y^* y_d + c_y$$

In the above, $f_x$ and $f_y$ are projections of a focal length in the x direction and the y direction, $c_x$ and $c_y$ are coordinates of a main point in the x direction and the y direction, $\alpha$ is an inclination coefficient, and $x_d$ and $y_d$ are normalized coordinates by taking distortion into account and can be calculated by the following equations:

$$x = X_C / Z_C$$

$$y = Y_C / Z_C$$

$$r = \sqrt{x^2 + y^2}$$

$$\begin{bmatrix} x_d \\ y_d \end{bmatrix} = (1 + k_1 r^2 + k_2 r^4 + k_3 r^6) \begin{bmatrix} x \\ y \end{bmatrix} + \begin{bmatrix} 2p_1 xy + p_2(r^2 + 2x^2) \\ 2p_2 xy + p_1(r^2 + 2y^2) \end{bmatrix}$$

In the above, $k_1$, $k_2$, $k_3$, $p_1$ and $p_2$ are distortion coefficients; the radial distortions $k_1$, $k_2$ and $k_3$ but not the tangential distortions $p_1$ and $p_2$ are considered.

Thus, the mapping relationship between a three-dimensional point in a global coordinate system and the corresponding point in a two-dimensional image is summarized as below:

$$Z_c m = A[Rt] M_W$$

In the above, $$A = \begin{bmatrix} f_x & \alpha & c_x \\ 1 & f_y & c_y \\ 0 & 0 & 1 \end{bmatrix}.$$

A uniform matrix $H = A[R\ t]$. Each calibration board may correspond to one uniform matrix. According to a constraint condition, eight constraint equations can be generated from four calibration boards, thereby solving five parameters in A, the rotation matrix and the translation matrix.

Selectively, the first processor is further for optimizing the intrinsic parameters of the first camera device according to a difference between real coordinates of the first pattern and coordinates of the first pattern obtained from calculating the intrinsic parameters of the first camera device, and for optimizing the intrinsic parameters of the second camera device according to a difference between the real coordinates of the first pattern and coordinates of the first pattern obtained from calculating the intrinsic parameters of the second camera device. More specifically, an error function $E = \Sigma_i |\overline{m}_i - f(A, R, t, M_i)|^2$ is established, where $f(\bullet)$ is a mapping relationship between a point in a three-dimensional global coordinate system and the corresponding point in a two-dimensional image; $\overline{m}_i$ is the coordinates of a first pattern point, such as the center of a circular point in FIG. 3, in a two-dimensional image, e.g., the common two-dimensional image or the infrared image; and $M_i$ is the real coordinates of the first pattern, e.g., the center of a circular point, in a three-dimensional global coordinate system. Through optimization, the error function E is minimized to thereby acquire more accurate internal reference, external reference and distortion parameters for a camera. For example, the optimization may be a least square method. Selectively, the error function may also be established through the real coordinates of the first pattern in a three-dimensional global coordinate system, and a difference between coordinates in a two-dimensional image and three-dimensional coordinates in the three-dimensional global coordinate system calculated from a mapping relationship of the coordinates in the two-dimensional image and the three-dimensional global coordinate system.

The intrinsic parameters of the first camera device include a rotation matrix and a translation matrix from the global coordinate system to the coordinate system of the first camera device. The intrinsic parameters of the second camera device includes a rotation matrix and a translation matrix from the global coordinate system to the coordinate system of the second camera device. The first processor is further for calculating a relative rotation matrix between the first camera device and the second camera device according to the rotation matrix from the global coordinate system to the coordinate system of the first camera device and the rotation matrix from the global coordinate system to the coordinate system of the second camera device. The first processor is further for calculating a relative translation matrix between the first camera device and the second camera device according to the translation matrix from the global coordinate system to the coordinate system of the first camera device, the translation matrix from the global coordinate system to the coordinate system of the second camera device, and the relative rotation matrix between the first camera device and the second camera device.

More specifically, according to respective translation matrices and rotation matrices of the first camera device (which may be an RGB camera device) and the infrared camera device obtained, a relative attitude of the two cameras can be acquired according to the following equations:

$$R_{relative}=R_{rgb}(R_{IR})^T$$

$$T_{relative}=T_{rgb}-R_{relative}T_{IR}$$

In the above, $R_{relative}$ is the relative rotation matrix between the two cameras, $T_{relative}$ is the relative translation matrix between the two cameras, $R_{rgb}$ represents the rotation matrix from the global coordinate system to the RGB camera device, $R_{IR}$ represents the rotation matrix from the global coordinate system to the infrared camera device, $T_{rgb}$ represents the translation matrix from the global coordinate system to the RGB camera device, and $T_{IR}$ represents the translation matrix from the global coordinate system to the IR camera device. Selectively, a reprojection error equation may be established and optimized; that is, an equation between two corresponding cameras can be established and optimized to acquire more accurate relative external reference.

Selectively, regarding a binocular stereo imaging type depth camera device, the device includes two infrared camera devices and an RGB camera device, and two rounds of calibration needs to be performed according to the method provided by the present invention, respectively by: (1) two infrared camera devices (including internal reference and relative external reference); (2) one of the infrared camera devices and one RGB camera device (internal reference and external reference). First, an infrared image is collected using an infrared mirror device having a visual angle consistent with a depth image, and a color image is at the same time acquired. The foregoing method is performed to acquire respective internal reference and external reference of the infrared mirror device and the RGB camera device to align the depth image and the color image. An infrared image is acquired simultaneously by each of the two infrared camera devices. The foregoing method is repeated to acquire respective internal reference and external reference of the two infrared camera devices for use of calculation of the depth image.

The method and device for calibration provided by the present invention can enhance calibration efficiency by a simple calibration method when calibrating a depth camera device.

Figure 6:
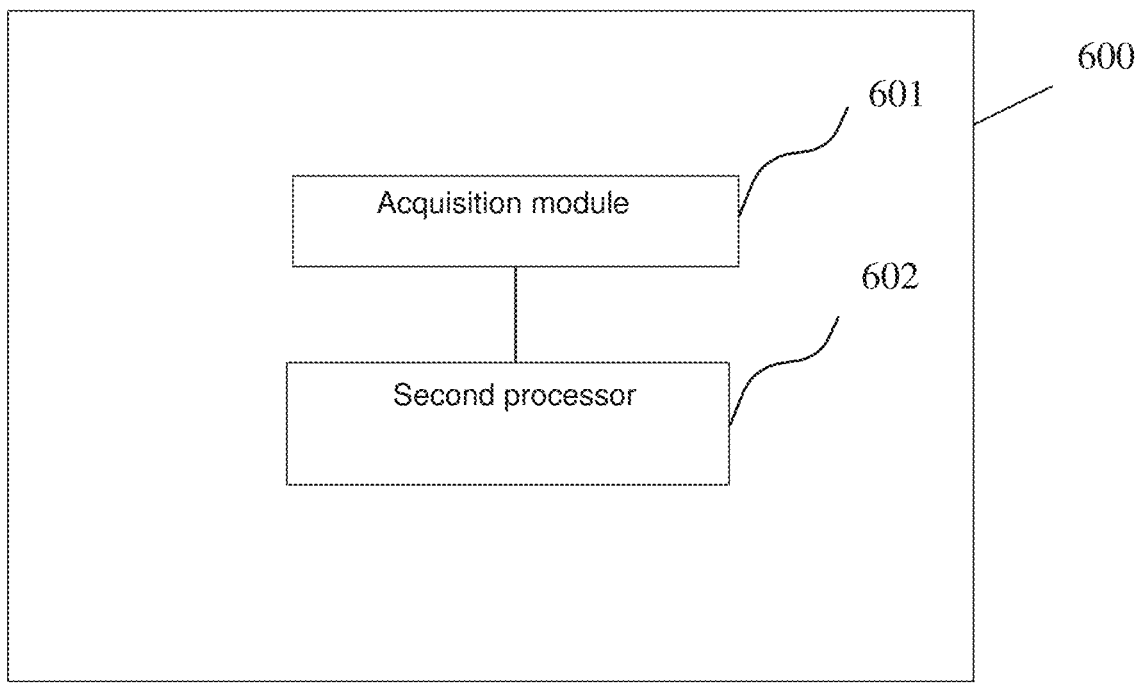
FIG. 6 is a block diagram of a device for calibration provided according to a third embodiment of the present invention.

A device 600 for calibration provided according to a third embodiment of the present invention is described in detail with FIG. 6 below. As shown in FIG. 6, the device 600 includes an acquisition module 601 and a second processor 602.

The acquisition module 601 is for acquiring a common two-dimensional image and an infrared image of a calibration object, wherein the calibration object carries a first pattern.

Selectively, the common two-dimensional image and/or the infrared image may be acquired from a storage device, and the storage device may be random access memory (RAM) or a flash memory.

The common two-dimensional image may be captured by a first camera device, and the infrared image may be captured by a second camera device. The common two-dimensional image includes a black-and-white image or a color image, and the color image may be an RGB image.

The acquisition module 601 can specifically receive the images stored in the storage device, and the process can be completed through a processor instruction.

The second processor 602 is for calculating coordinates of the first pattern in the common two-dimensional image according to the common two-dimensional image, acquiring coordinates of the first pattern in a global coordinate system, and calculating, according to the coordinates of the first pattern in the common two-dimensional image and the coordinates of the first pattern in the global coordinate system, intrinsic parameters of the first camera device capturing the common two-dimensional image; and further for, calculating coordinates of the first pattern in the infrared image according to the infrared image, acquiring the coordinates of the first pattern in the global coordinate system, and calculating, according to the coordinates of the first pattern in the infrared image and the coordinates of the first pattern in the global coordinate system, intrinsic parameters of the second camera device capturing the infrared image.

The acquisition module is specifically for capturing one common two-dimensional image and one infrared image of the calibration object. It should be noted that, the term "simultaneously" is not strictly the same moment, and may be approximately the same time; that is, compared to the prior art in which a first camera device and a second camera device are required to respectively sequentially capture the calibration object, the first camera device and the second camera device of the present invention are not required to respectively sequentially capture the calibration object, thus enhancing the calibration efficiency.

The common two-dimensional image of the calibration object includes at least three equal-sized calibration boards, and the infrared image of the calibration object includes at least three equal-sized calibration boards, wherein the first patterns carried by the at least three calibration boards are identical. The first pattern includes first circular points or first ellipsoidal points distributed on the calibration board, and a difference between grayscale values of the first circular points or the first ellipsoidal points and a background of the calibration board is greater than a first threshold. Selectively, when the calibration object includes three equal-sized calibration boards, the three equal-sized calibration boards may be arranged at positions forming an upright triangle, that is, one of the three equal-sized calibration boards is arranged right above the middle of the two other calibration boards arranged side by side below. Selectively, the first threshold is 80. For example, the first circular points or the first ellipsoidal points are black with a grayscale value of less than 100, and the background of the calibration board can be white with a grayscale value of more than 180. Selectively, a long side of the calibration board is parallel to the first camera device and the second camera device.

Selectively, the first circular points or the first ellipsoidal points are evenly distributed in rows and columns on the calibration board, as shown in FIG. 2. Selectively, a calibration image of on the calibration board may have a frame, which may be black. Selectively, the calibration image has a length of 290 mm and a width of 210 mm. In FIG. 2, the first pattern are small circular points having a diameter of 10 mm, and a distance between the small circular points is 10 mm. The black frame in the calibration image has a width of 10 mm. In the calibration image, there are 13 circular points on the long side, and 9 circular points on the short side.

The common two-dimensional image of the calibration object includes four equal-sized calibration boards, and the infrared image of the calibration object includes four equal-sized calibration boards, wherein the four calibration boards are arranged in two rows and two columns. With the first camera device facing the four calibration boards, positions of the four calibration boards are defined as upper-left, upper-right, lower-left and lower-right, wherein for each calibration board, a vertical center axis thereof is defined as a vertical rotation axis, from which a downward direction is a positive direction of the vertical rotation axis, and a horizontal center axis thereof is defined as a horizontal rotation axis, from which a right direction is a positive direction of the horizontal rotation axis. A plane where the upper-left calibration is located is parallel to an imaging plane of the first camera device, the upper-right calibration board is rotated clockwise around the vertical rotation axis thereof by a first angle, the lower-left calibration board is rotated counterclockwise around the vertical rotation axis thereof by the first angle, and the lower-right calibration board is rotated counterclockwise around the horizontal rotation axis thereof by the first angle. The features "with the first camera device facing the four calibration boards, and positions of the four calibration boards are defined as upper-left, upper-right, lower-left and lower-right" serve descriptive purposes for naming the four calibration boards, and are not to be construed as limitations to the present invention. As shown in FIG. 3, the first angle may be approximately 30 degrees with an error of 5 degrees, or may have a larger offset according to precision requirements. The descriptive terms relating to positions, such as "parallel" and "middle" are approximate description rather than strict requirements, for example, approximately parallel.

The calibration object carries a pattern indicating a placement direction of the calibration board. The pattern indicating the placement direction of the calibration object may include one of: a first number of second circular points arranged in one row and a second number of second circular points arranged in another row; the first number of second circular points arranged in one column, and the second number of second circular points arranged in another column; and the second circular points are arranged so as to form a pattern indicating the placement direction of the calibration object. The term "one row" refers to a certain row and does not represent an order in an arrangement. For example, as shown in FIG. 2 or FIG. 3, the term "one row" may be a fourth row from top to bottom in the arrangement, and the term "another row" may be a sixth row from top to bottom in the arrangement. As shown in FIG. 2 or FIG. 3, the second circular points are the large circular points in the drawing, and the large points may have a diameter of 15 mm. Selectively, the pattern indicating the placement direction of the calibration object as arranged by the second circular points may include: an arrow pattern or other equivalent patterns. Through the pattern indicating the placement direction of the calibration object, multiple calibration boards can be placed along the same direction.

The step of calculating the intrinsic parameters of the first camera device and the step of calculating the intrinsic parameters of the second camera device may be mutually independent and are not limited to being performed in a specific order. For example, the two steps may be performed in parallel.

The step of calculating the coordinates of the first pattern in the common two-dimensional image according to the common two-dimensional image, and the step of acquiring the coordinates of the first pattern in the global coordinate system are not limited to being performed in a specific order; the above steps of calculating and acquiring the coordinates may be simultaneously performed, the step of calculating the coordinates may be performed before the step of acquiring the coordinates, or the step of acquiring the coordinates may be performed before the step of calculating the coordinates. Similarly, the step of calculating the coordinates of the first pattern in the infrared image according to the infrared image, and the step of acquiring the coordinates of the first pattern in the global coordinate system are not limited to being performed in a specific order; the above steps of calculating and acquiring the coordinates may be simultaneously performed, the step of calculating the coordinates may be performed before the step of acquiring the coordinates, or the step of acquiring the coordinates may be performed before the step of calculating the coordinates. FIG. 9 shows a global coordinate system, an image coordinate system, and a camera device coordinate system by taking an infrared camera and an RGB camera as an example.

The step of calculating the coordinates of the first pattern in the common two-dimensional image according to the common two-dimensional image, and the step of calculating the coordinates of the first pattern in the infrared image according to the infrared image are not limited to being performed in a specific order; the step of calculating the coordinates of the first pattern in the common two-dimensional image and the step of calculating the coordinates of the first pattern in the infrared image can be performed simultaneously, the step of calculating the coordinates of the first pattern in the common two-dimensional image can be performed before the step of calculating the coordinates of the first pattern in the infrared image, or the step of acquiring the coordinates can be performed before the step of calculating the coordinates of the first pattern in the infrared image. Similarly, the step of calculating the coordinates of the first pattern in the common two-dimensional image and the step of calculating the intrinsic parameters of the second camera device capturing the infrared image are not limited to being performed in a specific order. Similarly, the step of calculating the coordinates of the first pattern in the infrared image and the step of calculating the coordinates of the intrinsic parameters of the first camera device capturing the common two-dimensional image are not limited to being performed in a specific order.

Selectively, in the step of calculating the coordinates of the first pattern in the infrared image according to the infrared image and acquiring the coordinates of the first pattern in the global coordinate system, if the coordinates of the first pattern in the global coordinate system are previously calculated and obtained, the step of acquiring may be reading the obtained coordinates of the first pattern in the global coordinate system. Similarly, in the step of calculating the coordinates of the first pattern in the common two-dimensional image according to the common two-dimensional image and acquiring the coordinates of the first pattern in the global coordinate system, if the coordinates of the first pattern in the global coordinate system are previously calculated and obtained, the step of acquiring can be reading the obtained coordinates of the first pattern in the global coordinate system.

The acquisition module is specifically for acquiring coordinates of centers of the first circular points or the first ellipsoidal points in the global coordinate system. The acquisition module is specifically for detecting coordinates of centers of the first circular points or the first ellipsoidal points in the common two-dimensional image. The acquisition module is specifically for detecting coordinates of the centers of the first circular points or the first ellipsoidal points in the infrared image. More specifically, in this embodiment, the positions of different first patterns in the calibration boards are fixed (for example, a distance between circular points in the calibration boards is fixed, and a distance between calibration boards is fixed), and relative positions of the first pattern and the camera devices are also fixed. Thus, the coordinates of the first pattern in the global coordinate system can be obtained in advance. In practice, during the calibration process, a calibration box can be used. In a calibration box, positions of the calibration boards are fixed, and positions for placing camera devices are also fixed. Selectively, taking a circular point for example, a method for calculating the center thereof may be: first converting an input image to a grayscale image that is then binarized, wherein bright areas have a grayscale value of 255 (e.g., white areas on the calibration board) and dark areas have a grayscale value of 0 (e.g., black circular points on the calibration board). A connected domain having a grayscale value of 255 in the binary image is detected. For each connected domain having a grayscale value of 255, a surrounding connecting domain having a grayscale value of 0 is detected, and it is determined whether a circle condition is satisfied. If the circle condition is satisfied, the center thereof is calculated. Circular connected domains surrounded by the same connecting domain having a grayscale value of 255 are sorted and stored according to rows.

Selectively, the first camera device and the second camera device have different fields of view. The method provided by the embodiment of the present invention can calibrate a camera device group consisting of at least two camera devices, and the fields of view of the at least two camera devices may be different.

Selectively, an image captured by, between the first camera device and the second camera device, the camera device having a greater field of view includes an image of the entire calibration object. The image of the calibration object occupies a middle part of the common two-dimensional image, and occupies more than a first ratio of the common two-dimensional image; an image of the calibration object occupies a middle part of the infrared image, and occupies more than a first ratio of the infrared image. Preferably, the first ratio may be 80%, and the first ratio may be appropriately reduced according to the calibration precision.

Selectively, the coordinates of the same first pattern in the common two-dimensional image correspond to the coordinates of the first pattern in the infrared image. More specifically, a corresponding relationship needs to be established between the coordinates of the same first pattern in the common two-dimensional image and the coordinates of the first pattern in the infrared image. The method for establishing the corresponding relationship may be performed through sorting and storing the sequences of the acquired coordinates of the first pattern in the two types of two-dimensional images.

The second processor is specifically for calculating, according to the coordinates of the first pattern in the common two-dimensional image, the coordinates of the first pattern in the global coordinate system, and a mapping relationship between a coordinate system of the common two-dimensional image and the global coordinate system, the intrinsic parameters of the first camera device capturing the common two-dimensional image. The second processor is specifically for calculating, according to the coordinates of the first pattern in the infrared image, the coordinates of the first pattern in the global coordinate system, and a mapping relationship between a coordinate system of the infrared image and the global coordinate system, the intrinsic parameters of the second camera device capturing the infrared image.

More specifically, the coordinates of a point in the global coordinate system can undergo rotation and translation to obtain coordinates of the point in a coordinate system of a camera device, as mathematically expressed below:

$$M_C = RM_W + T$$

In the above equation, R is a rotation matrix between the global coordinate system and the coordinate system of the camera device, T is a translation matrix between the global coordinate system and the coordinate system of the camera device, $M_W = (X_W, Y_W, Z_W)$ is the coordinates of the point in the global coordinate system, and $M_C = (X_C, Y_C, Z_C)$ is the coordinates of the point in the coordinate system of the camera device.

The transformation relationship between the coordinates $m = (u, v)$ of the point in a two-dimensional image and the coordinates $M_C$ of the corresponding point in a three-dimensional camera coordinate system may be represented as:

$$u = f_x * (x_d + \alpha * y_d) + c_x$$

$$v = f_y * y_d + c_y$$

In the above, $f_x$ and $f_y$ are projections of a focal length in the x direction and the y direction, $c_x$ and $c_y$ are coordinates of a main point in the x direction and the y direction, $\alpha$ is an inclination coefficient, and $x_d$ and $y_d$ are normalized coordinates by taking distortion into account and can be calculated by the following equations:

$$x = X_C/Z_C$$

$$y = Y_C/Z_C$$

$$r = \sqrt{x^2 + y^2}$$

$$\begin{bmatrix} x_d \\ y_d \end{bmatrix} = (1 + k_1 r^2 + k_2 r^4 + k_3 r^6) \begin{bmatrix} x \\ y \end{bmatrix} + \begin{bmatrix} 2p_1 xy + p_2(r^2 + 2x^2) \\ 2p_2 xy + p_1(r^2 + 2y^2) \end{bmatrix}$$

In the above, $k_1$, $k_2$, $k_3$, $p_1$ and $p_2$ are distortion coefficients; the radial distortions $k_1$, $k_2$ and $k_3$ but not the tangential distortions $p_1$ and $p_2$ are considered.

Thus, the mapping relationship between a three-dimensional point in a global coordinate system and the corresponding point in a two-dimensional image is summarized as below:

$$Z_c m = A[R\ t] M_W$$

In the above, $$A = \begin{bmatrix} f_x & \alpha & c_x \\ 1 & f_y & c_y \\ 0 & 0 & 1 \end{bmatrix}.$$

A uniform matrix $H = A[R\ t]$. Each calibration board may correspond to one uniform matrix. According to a constraint condition, eight constraint equations can be generated from four calibration boards, thereby solving five parameters in A, the rotation matrix and the translation matrix.

The second processor is further for optimizing the intrinsic parameters of the first camera device according to a difference between real coordinates of the first pattern and coordinates of the first pattern obtained from calculating the intrinsic parameters of the first camera device, and for optimizing the intrinsic parameters of the second camera device according to a difference between the real coordinates of the first pattern and coordinates of the first pattern obtained from calculating the intrinsic parameters of the second camera device. More specifically, an error function $E=\Sigma_i|\overline{m}_i-f(A, R, t, M_i)|^2$ is established, where f(•) is a mapping relationship between a point in a three-dimensional global coordinate system and the corresponding point in a two-dimensional image; $\overline{m}_i$ is the coordinates of a first pattern point, such as the center of the circular point in FIG. 3, in a two-dimensional image, e.g., the common two-dimensional image or the infrared image; and $M_i$ is the real coordinates of a first pattern, e.g., the center of a circular point, in a three-dimensional global coordinate system. Through optimization, the error function E is minimized to thereby acquire more accurate internal reference, external reference and distortion parameters for a camera. For example, the optimization may be a least square method. Selectively, the error function may also be established through the real coordinates of the first pattern in a three-dimensional global coordinate system, and a difference between coordinates in a two-dimensional image and three-dimensional coordinates in the three-dimensional global coordinate system calculated from a mapping relationship of the coordinates in the two-dimensional image and the three-dimensional global coordinate system.

Selectively, the intrinsic parameters of the first camera device include a rotation matrix and a translation matrix from the global coordinate system to the coordinate system of the first camera device. The intrinsic parameters of the second camera device includes a rotation matrix and a translation matrix from the global coordinate system to the coordinate system of the second camera device. The second processor is further for calculating a relative rotation matrix between the first camera device and the second camera device according to the rotation matrix from the global coordinate system to the coordinate system of the first camera device and the rotation matrix from the global coordinate system to the coordinate system of the second camera device, and calculating a relative translation matrix between the first camera device and the second camera device according to the translation matrix from the global coordinate system to the coordinate system of the first camera device, the translation matrix from the global coordinate system to the coordinate system of the second camera device, and the relative rotation matrix between the first camera device and the second camera device.

More specifically, according to respective translation matrices and rotation matrices of the first camera device (which may be an RGB camera device) and the infrared camera device obtained, a relative attitude of the two cameras can be acquired according to the following equations:

$$R_{relative}=R_{rgb}(R_{IR})^T$$

$$T_{relative}=T_{rgb}-R_{relative}T_{IR}$$

In the above, $R_{relative}$ is the relative rotation matrix between the two cameras, $T_{relative}$ is the relative translation matrix between the two cameras, $R_{rgb}$ represents the rotation matrix from the global coordinate system to the RGB camera device, $R_{IR}$ represents the rotation matrix from the global coordinate system to the infrared camera device, $T_{rgb}$ represents the translation matrix from the global coordinate system to the RGB camera device, and $T_{IR}$ represents the translation matrix from the global coordinate system to the IR camera device. Selectively, a reprojection error equation may be established and optimized; that is, an equation between two corresponding cameras can be established and optimized to acquire more accurate relative external reference.

Selectively, regarding a binocular stereo imaging type depth camera device, the device includes two infrared camera devices and an RGB camera device, and two rounds of calibration needs to be performed according to the method provided by the present invention, respectively by: (1) two infrared camera devices (including internal reference and relative external reference); (2) one of the infrared camera devices and one RGB camera device (internal reference and external reference). First, an infrared image is collected using an infrared mirror device having a visual angle consistent with a depth image, and a color image is at the same time acquired. The foregoing method is performed to acquire respective internal reference and external reference of the infrared mirror device and the RGB camera device to align the depth image and the color image. An infrared image is acquired simultaneously by each of the two infrared camera devices. The foregoing method is repeated to acquire respective internal reference and external reference of the two infrared camera devices for use of calculation of the depth image.

The method and device for calibration provided by the present invention can enhance calibration efficiency by a simple calibration method when calibrating a depth camera device.

Figure 7:
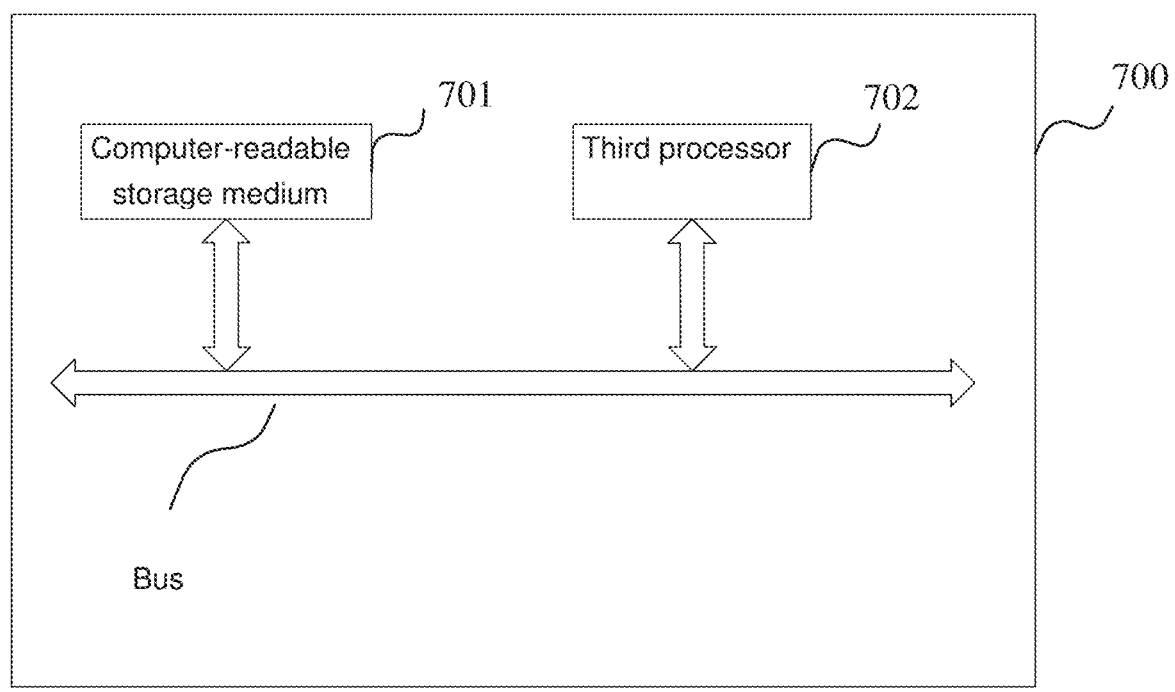
FIG. 7 is a block diagram of a device for calibration provided according to a fourth embodiment of the present invention.

A device 700 for calibration provided according to a fourth embodiment of the present invention is described in detail with reference to FIG. 7 below. The device 700 includes a computer-readable storage medium 701. The computer-readable storage medium 701 stores a computer program, which realizes the steps of the method of the first embodiment when executed by a third processor 703. As shown in FIG. 7, selectively, the device 700 may include a bus.

Details of functions of the components of this embodiment can be referred from the description associated with the third embodiment.

The device for calibration provided by the present invention can enhance calibration efficiency by a simple calibration method when calibrating a depth camera device.

Figure 8:
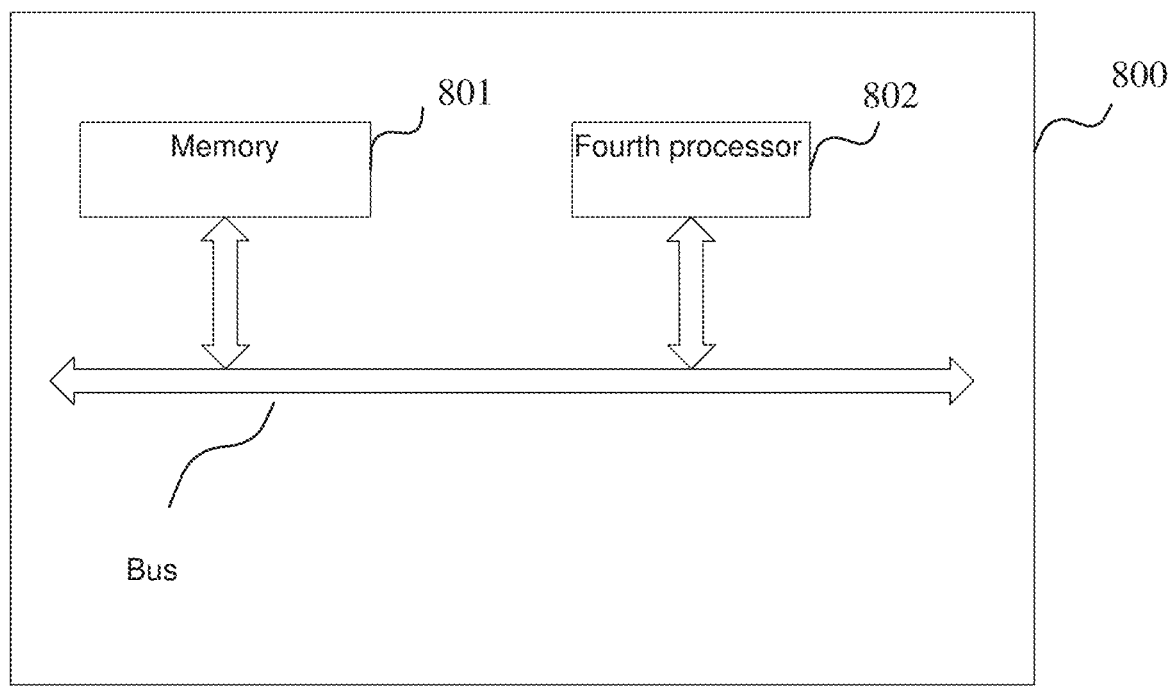
FIG. 8 is a block diagram of a device for calibration provided according to a fifth embodiment of the present invention.

A device 800 for calibration provided according to a fifth embodiment of the present invention is described in detail with reference to FIG. 8 below. The device includes a memory 801, a fourth processor 802, and a computer program that is stored in the memory 801 and can be run in the fourth processor 802. The computer program realizes the steps of the method of the first embodiment when executed by the fourth processor 802. Selectively, as shown, the device 800 further includes a bus.

The device for calibration provided by the present invention can enhance calibration efficiency by a simple calibration method when calibrating a depth camera device.

In the above embodiments, a depth value test can be added to the calibration process, and a depth diagram is at the same time acquired when capturing an infrared image and a color image. In the depth diagram, a depth value of non-rotated calibration board is compared with an actual measured value, and calibration can be continued if the difference is less than a specified error range, or a depth sensor needs to be corrected if the difference is more than the specified error range and calibration is again performed.

For example, the computer program can be divided into one or multiple modules/units, wherein the one or multiple modules/units are stored in the memory and are executed by the processor to complete the present invention. The one or more modules/units can be a series of computer instruction segments capable of accomplishing a predetermined function, and the instruction segments are for describing an execution process of the computer program in the device/terminal apparatus.

The device/terminal apparatus may be computer apparatuses such as a cell phone, a tablet computer, a desktop computer, a notebook, a palm computer and a cloud server. The device/terminal apparatus may include, for example but not limited to, a processor and a memory. A person skilled in the art can understand that, the illustrative drawings of the present invention are examples of a device/terminal apparatus and are not to be interpreted as limitations to the device/terminal apparatus; the device/terminal apparatus may further include such as an input/output device, a network access device and a bus.

The processor may be a central processing unit (CPU), a general-purpose processor, a digital signal processor (DSP), an application-specific integrated circuit (ASIC), a field-programmable gate array (FPGA), other programmable logic gate devices, a discrete gate or transistor logic device, or discrete hardware component. The general-purpose processor may be a microprocessor or may be any conventional processor. The processor is a control center of the device/terminal apparatus, and uses various interfaces and wires to connect various parts of the entire device/terminal apparatus.

The memory can be used for storing a computer program and/or a module. The processor realizes various functions of the device/terminal apparatus by running or executing the computer program and/or module stored in the memory and invoking data stored in the memory. The memory may include a program storage region and a data storage region. The program storage region may store an operating system or an application needed by at least one function (e.g., an image playback function). The data storage may store user-established data (e.g., video data and images). Further, the memory may include a high-speed RAM, or a non-volatile memory, e.g., a hard drive, a memory, a pluggable hard drive, a smart media card (SMC), a Secure Digital (SD) card, a flash card, at least one disk storage device, a flash memory device, or other volatile memory device.

When the modules/units integrated in the device/terminal apparatus are implemented in form of software function units and made as an independent product for sale and use, the modules/units in form of software function units may be stored in a computer-readable storage medium. On the basis of such understanding, all or a part of the method of the above embodiments of the present invention can be realized, or be completed by associated hardware through an instruction of a computer program. The computer program may be stored in a computer-readable storage medium and can accomplish the above steps when executed by a processor. The computer program includes a computer program code, which may be in form of a source code, an object code, an executable file or some intermediate forms. The computer-readable storage medium may include: any entity or device, recording medium, U-drive, mobile drive, magnetic drive, optic disk, computer memory, read-only memory (ROM), random access memory (RAM), electrical carrier signals, telecommunication signals or software distribution medium capable of carrying the computer program code.

The image of the target object in the foregoing embodiments may be a partial image of the target object or an entire imaging of the target object. For both a partial image and an entire imaging, any modifications correspondingly made to the partial image and entire image are applicable to the method or device provided by the present invention. The above modifications can be made by a person skilled in the art without involving inventive skills and are thus encompassed within the protection scope of the present invention.

What is claimed is:

1. A method for calibration, comprising:
   acquiring a common two-dimensional image and an infrared image of a calibration object, wherein the calibration object comprises a first pattern, wherein an image of the calibration object in the common two-dimensional image occupies more than a first ratio of the common two-dimensional image, and wherein an image of the calibration object in the infrared image occupies more than the first ratio of the infrared image;
   calculating coordinates of the first pattern in the common two-dimensional image according to the common two-dimensional image, acquiring coordinates of the first pattern in a global coordinate system, and calculating, according to the coordinates of the first pattern in the common two-dimensional image and the coordinates of the first pattern in the global coordinate system, intrinsic parameters of a first camera device capturing the common two-dimensional image; and
   calculating coordinates of the first pattern in the infrared image according to the infrared image, and calculating, according to the coordinates of the first pattern in the infrared image and the coordinates of the first pattern in the global coordinate system, intrinsic parameters of a second camera device capturing the infrared image.

2. The method according 1, wherein:
   the calibration object comprises at least three equal-sized calibration boards, wherein first patterns carried by the at least three calibration boards are identical; and
   the first pattern comprises first circular points or first ellipsoidal points distributed on the calibration board, and a difference between grayscale values of the first circular points or the first ellipsoidal points and a background of the calibration board is greater than a first threshold.

3. The method according to claim 2, wherein:
   the first circular points and the first ellipsoidal points are evenly distributed in rows and columns on the calibration board.

4. The method according to claim 3, wherein:
   the step of acquiring the coordinates of the first pattern in the global coordinate system comprises acquiring coordinates of centers of the first circular points or the first ellipsoidal points in the global coordinate system;
   the step of calculating the coordinates of the first pattern in the common two-dimensional image according to the common two-dimensional image comprises detecting coordinates of the centers of the first circular points or the first ellipsoidal points in the common two-dimensional image; and
   the step of calculating the coordinates of the first pattern in the infrared image according the infrared image comprises detecting coordinates of the centers of the first circular points or the first ellipsoidal points in the infrared image.

5. The method according to claim 1, wherein:
   the coordinates of the same first pattern in the common two-dimensional image correspond to the coordinates of the first pattern in the infrared image.

6. The method according to claim 2, wherein:
the at least three equal-sized calibration boards comprised in the calibration object comprise four equal-sized calibration boards comprised in the calibration object, wherein the four calibration boards are arranged in two rows and two columns; and
with the first camera device facing the four calibration boards, positions of the four calibration boards are defined as upper-left, upper-right, lower-left and lower-right, wherein for each calibration board, a vertical center axis thereof is defined as a vertical rotation axis, from which a downward direction is a positive direction of the vertical rotation axis, and a horizontal center axis thereof is defined as a horizontal rotation axis, from which a right direction is a positive direction of the horizontal rotation axis; a plane where the upper-left calibration is located is parallel to an imaging plane of the first camera device, the upper-right calibration board is rotated clockwise around the vertical rotation axis thereof by a first angle, the lower-left calibration board is rotated counterclockwise around the vertical rotation axis thereof by the first angle, and the lower-right calibration board is rotated counterclockwise around the horizontal rotation axis thereof by the first angle.

7. The method according to claim 6, wherein:
the first angle is 30 degrees.

8. The method according to claim 1, wherein:
the calibration object carries a pattern indicating a placement direction of the calibration board.

9. The method according to claim 8, wherein:
the pattern indicating the placement direction of the calibration object comprises one of:
 a first number of second circular points arranged in one row, and a second number of second circular points arranged in another row;
 the first number of second circular points arranged in one column, and the second number of second circular points arranged in another column; and
 the second circular points are arranged to form a pattern indicating the placement direction of the calibration object.

10. The method according to claim 1, wherein:
the first camera device and the second camera device have different fields of view.

11. The method according to claim 1, wherein:
between the first camera device and the second camera device, the camera device having a greater field of view captures an image comprising the entire calibration object;
the image of the calibration object occupies a middle part of the common two-dimensional image, and occupies more than a first ratio of the common two dimensional image; and
the image of the calibration object occupies a middle part of the infrared image, and occupies more than the first ratio of the infrared image.

12. The method according to claim 1, wherein:
the first ratio is 80%.

13. The method according to claim 1, wherein:
the step of acquiring the common two-dimensional image and the infrared image of the calibration object comprises simultaneously capturing one common two-dimensional image and one infrared image of the calibration object.

14. The method according to claim 1, wherein:
the step of calculating, according to the coordinates of the first pattern in the common two-dimensional image and the coordinates of the first pattern in the global coordinate system, the intrinsic parameters of the first camera device capturing the common two-dimensional image comprises calculating, according to the coordinates of the first pattern in the common two-dimensional image, the coordinates of the first pattern in the global coordinate system, and a mapping relationship between a coordinate system of the common two-dimensional image and the global coordinate system, the intrinsic parameters of the first camera device capturing the common two-dimensional image; and
the step of calculating, according to the coordinates of the first pattern in the infrared image and the coordinates of the first pattern in the global coordinate system, the intrinsic parameters of the second camera device capturing the infrared image comprises calculating, according to the coordinates of the first pattern in the infrared image, the coordinates of the first pattern in the global coordinate system, and a mapping relationship between a coordinate system of the infrared image and the global coordinate system, the intrinsic parameters of the second camera device capturing the infrared image.

15. The method according to claim 1, further comprising:
optimizing the intrinsic parameters and distortion coefficients of the first camera device according to a difference between real coordinates of the first pattern and coordinates of the first pattern obtained from calculating the intrinsic parameters of the first camera device; and
optimizing the intrinsic parameters and distortion coefficients of the second camera device according to a difference between the real coordinates of the first pattern and coordinates of the first pattern obtained from calculating the intrinsic parameters of the second camera device.

16. The method according to claim 1, further comprising:
calculating a relative rotation matrix between the first camera device and the second camera device according to a rotation matrix from the global coordinate system to the coordinate system of the first camera device and a rotation matrix from the global coordinate system to the coordinate system of the second camera device; and
calculating a relative translation matrix between the first camera device and the second camera device according to a translation matrix from the global coordinate system to the coordinate system of the first camera device, a translation matrix from the global coordinate system to the coordinate system of the second camera device, and the relative rotation matrix between the first camera device and the second camera device.

17. The method according to claim 1, wherein:
the common two-dimensional image comprises a black-and-white image or a color image.

18. A system for calibration, comprising a calibration object, a first camera device, a second camera device and a processor, wherein:
the first camera device captures a common two-dimensional image of the calibration object, wherein the calibration object carries a first pattern;
the second camera device captures an infrared image of the calibration object;
an image of the calibration object in the common two-dimensional image occupies more than a first ratio of the common two-dimensional image, and an image of the calibration object in the infrared image occupies more than the first ratio of the infrared image;

the processor calculates coordinates of the first pattern in the common two-dimensional image according to the common two-dimensional image, acquires coordinates of the first pattern in a global coordinate system, and calculates, according to the coordinates of the first pattern in the common two-dimensional image and the coordinates of the first pattern in the global coordinate system, intrinsic parameters of the first camera device capturing the common two-dimensional image; and the processor further calculates coordinates of the first pattern in the infrared image according to the infrared image, and calculates, according to the coordinates of the first pattern in the infrared image and the coordinates of the first pattern in the global coordinate system, intrinsic parameters of the second camera device capturing the infrared image.

19. A device for calibration, comprising:

an acquisition module, for acquiring a common two-dimensional image and an infrared image of a calibration object, wherein the calibration object carries a first pattern;

a processor, for:

calculating coordinates of the first pattern in the common two-dimensional image according to the common two-dimensional image, acquiring coordinates of the first pattern in a global coordinate system, and calculating, according to the coordinates of the first pattern in the common two-dimensional image and the coordinates of the first pattern in the global coordinate system, intrinsic parameters of the first camera device capturing the common two-dimensional image; and calculating coordinates of the first pattern in the infrared image according to the infrared image, and calculating, according to the coordinates of the first pattern in the infrared image and the coordinates of the first pattern in the global coordinate system, intrinsic parameters of the second camera device capturing the infrared image, wherein an image of the calibration object in the common two-dimensional image occupies more than a first ratio of the common two-dimensional image, and wherein an image of the calibration object in the infrared image occupies more than the first ratio of the infrared image.

20. A non-transitory computer-readable storage medium, storing a computer program that realizes the steps of the method of claim 1 when executed by a processor.

21. A device for image processing comprising a memory, a processor, and a computer program stored in the memory and operable to be run in the processor, wherein the computer program realizes the steps of the method of claim 1 when executed by the processor.

* * * * *

UNITED STATES PATENT AND TRADEMARK OFFICE
CERTIFICATE OF CORRECTION

PATENT NO. : 10,924,729 B2
APPLICATION NO. : 16/176439
DATED : February 16, 2021
INVENTOR(S) : Li Yu et al.

It is certified that error appears in the above-identified patent and that said Letters Patent is hereby corrected as shown below:

In the Claims

At Column 35, Claim number 11, Line number 54, the phrase ", and occupies more than a first ratio of the common two dimensional image" should be deleted.

At Column 35, Claim number 11, Line number 58, the phrase ", and occupies more than the first ratio of the infrared image" should be deleted.

Signed and Sealed this
Twenty-second Day of November, 2022

Katherine Kelly Vidal
*Director of the United States Patent and Trademark Office*